(12) United States Patent
Xu et al.

(10) Patent No.: US 11,664,030 B2
(45) Date of Patent: May 30, 2023

(54) INFORMATION PROCESSING METHOD, SYSTEM, ELECTRONIC DEVICE, AND COMPUTER STORAGE MEDIUM

(71) Applicant: ALIBABA GROUP HOLDING LIMITED, Grand Cayman (KY)

(72) Inventors: Chong Xu, Beijing (CN); Wei Li, Beijing (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 103 days.

(21) Appl. No.: 16/742,753

(22) Filed: Jan. 14, 2020

(65) Prior Publication Data

US 2020/0152200 A1    May 14, 2020

Related U.S. Application Data

(63) Continuation of application No. PCT/CN2018/095081, filed on Jul. 10, 2018.

(30) Foreign Application Priority Data

Jul. 19, 2017    (CN) .......................... 201710592686.1

(51) Int. Cl.
*G10L 15/26*    (2006.01)
*G06F 3/04883*    (2022.01)
(Continued)

(52) U.S. Cl.
CPC .......... *G10L 15/26* (2013.01); *G06F 3/04883* (2013.01); *G10L 15/04* (2013.01);
(Continued)

(58) Field of Classification Search
CPC ......... G10L 15/30; G10L 15/26; G10L 15/24; G06F 16/35

See application file for complete search history.

(56) References Cited

U.S. PATENT DOCUMENTS 6,477,491 B1 * 11/2002 Chandler ................ G10L 15/26
704/235
6,671,669 B1 * 12/2003 Garudadri ............... G10L 15/32
704/E15.049

(Continued)

FOREIGN PATENT DOCUMENTS

CN    1585018 A    2/2005
CN    101763382 A    6/2010
(Continued)

OTHER PUBLICATIONS

PCT International Search Report dated Sep. 25, 2018, issued in corresponding International Application No. PCT/US2018/095081 (5 pgs.).

(Continued)

*Primary Examiner* — Feng-Tzer Tzeng
(74) *Attorney, Agent, or Firm* — Finnegan, Henderson, Farabow, Garrett & Dunner, LLP

(57) ABSTRACT

An information processing method includes receiving first text information, which is generated according to a speech, input through a first input device; receiving audio information recorded by a second input device, wherein the audio information is generated and recorded according to the speech; performing speech recognition on the audio information to obtain second text information; and presenting the first text information and the second text information. A correspondence relationship exists between content in the first text information and content in the second text information.

20 Claims, 21 Drawing Sheets

(51) Int. Cl.
  *G10L 15/04* (2013.01)
  *G10L 15/22* (2006.01)
  *G10L 17/14* (2013.01)
  *G10L 15/24* (2013.01)
  *G06F 16/35* (2019.01)
  *G10L 15/30* (2013.01)

(52) U.S. Cl.
  CPC .............. *G10L 15/22* (2013.01); *G10L 17/14* (2013.01); *G06F 16/35* (2019.01); *G10L 15/24* (2013.01); *G10L 15/30* (2013.01); *G10L 2015/223* (2013.01); *G10L 2015/228* (2013.01)

(56) References Cited

U.S. PATENT DOCUMENTS

| | | | | |
|---|---|---|---|---|
| 7,702,512 | B2 * | 4/2010 | Gopinath | G10L 15/22 |
| | | | | 704/235 |
| 2006/0167685 | A1 * | 7/2006 | Thelen | G06V 30/1423 |
| | | | | 704/E15.041 |
| 2006/0167686 | A1 | 7/2006 | Kahn | |
| 2010/0138704 | A1 * | 6/2010 | Johnson | G06F 9/542 |
| | | | | 714/57 |
| 2012/0296645 | A1 * | 11/2012 | Carraux | G10L 15/22 |
| | | | | 704/E15.001 |

FOREIGN PATENT DOCUMENTS

| | | | | |
|---|---|---|---|---|
| CN | 101833985 A | | 9/2010 | |
| CN | 102906735 A | | 1/2013 | |
| CN | 105427857 A | | 3/2016 | |
| CN | 105810207 A | | 7/2016 | |
| CN | 106372122 A | * | 2/2017 | ............. G06F 16/35 |
| CN | 106782545 A | | 5/2017 | |
| CN | 106782551 A | | 5/2017 | |
| FR | WO 2002037223 | * | 11/2001 | |
| WO | WO 2000046787 A2 | * | 2/2000 | |
| WO | WO 2000046787 A2 | * | 8/2000 | |
| WO | WO 2002037223 A2 | * | 5/2002 | |

OTHER PUBLICATIONS

First Office Action issued in corresponding Chinese Application No. 201710592686.1 dated Nov. 22, 2022 (23 pages).

* cited by examiner

| | |
|---|---|
| XX:XX:XX<br>XXXX:XXXXXXXXXX<br><br><br><br><br><br>10:22:16<br>Zhang San: He lent Li Si 5,000 dollars in April, 2015, and it was agreed that the loan will be returned in June 2015. After the due date, Zhang San repeatedly urged Li Si to repay several times, but Li Si refused to repay. Zhang San thinks Li Si has the ability to repay the debt.<br><br>XX:XX:XX<br>XX:XXXXXXXXXXXXXXXXXXXX<br>XXXXXXXXXXXXXXXXX | XX:XX:XX<br>XXXX:XXXXXXXXXXXXXXXXXXX<br>XXXXXXXXXXXXX<br><br>XX:XX:XX<br>XXX:XXXXXXXXXXXXXXXXXX<br>XXXXXXXX<br><br>10:22:16<br>Speaker 1: I lent Li Si 5,000 dollars in April the year before last, and he promised to pay me back in two months. After two months, I went to him for it, but he put it off. Up to now, I have gone to him four times, but he has refused to pay me back with various excuses. As a matter of fact, I know that he has money. He even bought a car last month.<br><br>XX:XX:XX<br>XX:XXXXXXXXXXXXXXXXXXX<br>XXXXXXXXXXXXXXXXXXXXXXX<br>XXXXXXXXXXXXXXXXXXXX |

FIG. 3

| | |
|---|---|
| XX:XX:XX<br>XXXX:XXXXXXXXXX<br><br><br><br><br><br><br>10:22:16<br>Zhang San:<br>He lent Li Si 5,000 yuan in April 2015, and it was agreed that the loan will be returned in June, 2015. After the due date, Zhang San urged Li Si four times to repay, but Li Si refused to repay. Zhang San thinks Li Si has the ability to repay the debt, because Li Si bought a car in June 2017.<br><br>XX:XX:XX<br>XX:XXXXXXXXXXXXXXXXXX<br>XXXXXXXXXXXXXXXXX | XX:XX:XX<br>XXXX:XXXXXXXXXXXXXXXXXX<br>XXXXXXXXXXXXX<br><br>XX:XX:XX<br>XXX:XXXXXXXXXXXXXXXXXX<br>XXXXXXXX<br><br>10:22:16<br>Speaker 1: I lent Li Si 5,000 dollars in April the year before last, and he promised to pay me back in two months. After two months, I went to him for it, but he put it off. Up to now, I have gone to him four times, but he has refused to pay me back with various excuses. As a matter of fact, I know that he has money. He even bought a car last month.<br><br>XX:XX:XX<br>XX:XXXXXXXXXXXXXXXXXX<br>XXXXXXXXXXXXXXXXXXXXX<br>XXXXXXXXXXXXXXXXXXX |

FIG. 4

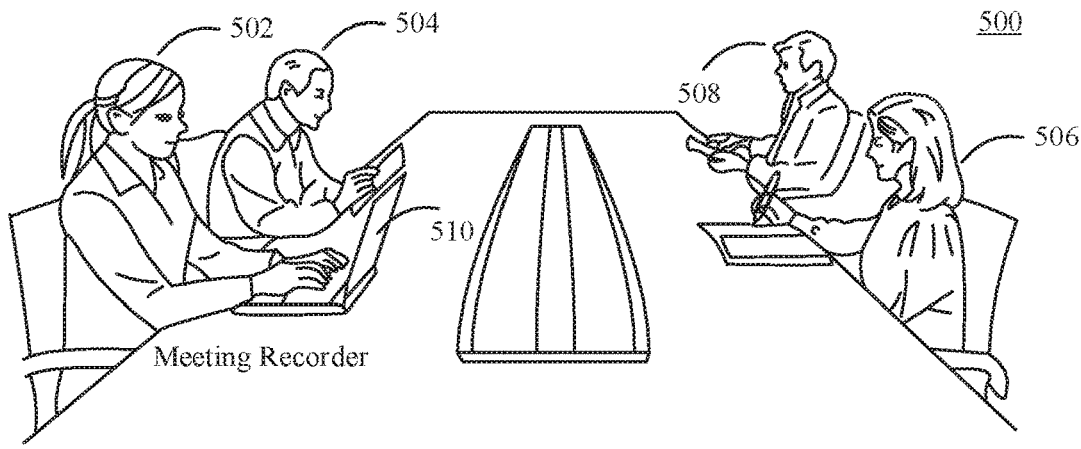

FIG. 5

Wang Wu:
Identified text: This is an urgent project, so we should pay close attention to the progress. We need to complete the project acceptance before the end of the year, so we need to hurry up. Can the R&D department provide a complete design scheme this month?
Stenographic text: This is an urgent project, so all departments need to speed up the progress.

Ding Qi:
Identified text: We are unable to provide a complete design scheme by the end of this month. We only have a preliminary design scheme for now and it is only possible to provide a more complete design scheme after purchasing raw materials and performing a preliminary verification. Therefore, the specific time to provide a complete design scheme depends on when the purchase of raw materials can be completed.

Qian Ba:
Identified text: We can complete the purchase of raw materials by the end of this month.
Stenographic text: The purchase of raw materials requested by the R&D department can be completed in this month.

Ding Qi:
Identified text: If the raw materials are available by the end of this month, we should be able to provide a complete design scheme by the middle of next month.
Stenographic text: If the purchasing department is able to complete the purchase of raw materials this month, we should be able to provide a complete design scheme in the next month.

Wang Wu:
Identified text: OK. Let's have the purchasing department complete the purchase of raw materials by the end of this month, and the R&D department provide a complete design scheme by the middle of the next month.

FIG. 6

Wang Wu:
Identified text: This is an urgent project, so we should pay close attention to the progress. We need to complete the project acceptance before the end of the year, so we need to hurry up. Can the R&D department provide a complete design scheme this month?
Stenographic text: This is an urgent project, and all departments need to speed up the progress in order to complete the project acceptance at the end of the year.

Ding Qi:
Identified text: We are unable to provide a complete design scheme by the end of this month. We only have a preliminary design scheme for now and it is only possible to provide a more complete design scheme after purchasing raw materials and performing a preliminary verification. Therefore, the specific time to provide a complete design scheme depends on when the purchase of raw materials can be completed.

Qian Ba:
Identified text: We can complete the purchase of raw materials by the end of this month.
Stenographic text: The purchase of raw materials requested by the R&D department can be completed in this month.

Ding Qi:
Identified text: If the raw materials are available by the end of this month, we should be able to provide a complete design scheme by the middle of next month.
Stenographic text: If the purchasing department is able to complete the purchase of raw materials this month, we should be able to provide a complete design scheme by the middle of the next month.

Wang Wu:
Identified text: OK. Let's have the purchasing department complete the purchase of raw materials by the end of this month, and the R&D department provide a complete design scheme by the middle of the next month.

FIG. 7

INFORMATION PROCESSING METHOD, SYSTEM, ELECTRONIC DEVICE, AND COMPUTER STORAGE MEDIUM

CROSS-REFERENCE TO RELATED APPLICATIONS

The present application claims priority to International Application No. PCT/CN2018/095081, filed Jul. 10, 2018, which claims priority to and the benefits of Chinese Patent Application No. 201710592686.1, filed on Jul. 19, 2017, both of which are incorporated herein by reference in their entireties.

TECHNICAL FIELD

The present disclosure relates to the field of computer technologies, and in particular, to information processing methods, information processing systems, electronic devices, and computer storage media.

BACKGROUND

People communicate and discuss matters together in real life. In the communication process, a person is usually designated to record communication matters to form a record. Specifically, for example, a meeting record is required for a multi-person meeting in office; a court record is formed after a court hearing, and so on.

Conventionally, it is common for people to make a handwritten record. Due to the slow handwriting speed and the poor editability of records written on paper, people gradually shift to making records with computers. For example, a court clerk operates a computer to make a court record in a court hearing.

SUMMARY

Embodiments of the present disclosure provide information processing methods, electronic devices, and computer storage medium.

According to some embodiments of the present disclosure, information processing methods are provided, One exemplary information processing method includes: receiving first text information through a first input device, in which the first text information is generated according to a speech; receiving audio information recorded by a second input device, in which the audio information is generated and recorded according to the speech; performing speech recognition on the audio information to obtain second text information; and presenting the first text information and the second text information, wherein a correspondence relationship exists between content in the first text information and content in the second text information.

According to some embodiments of the present disclosure, information processing systems are provided. One exemplary information processing system includes: an input device configured to receive first text information input by a user, in which the first text information is generated according to a speech, a processor configured to perform speech recognition on the audio information to obtain second text information, and an audio acquisition terminal configured to record audio information according to the speech, a display device configured to present the first text information and the second text information, wherein a correspondence relationship exists between content in the first text information and content in the second text information.

According to some embodiments of the present disclosure, non-transitory computer-readable media are provided. One exemplary non-transitory computer-readable medium stores a set of computer program instructions that are executable by one or more processors of a device to cause the device to perform a method including: receiving first text information through a first input device, in which the first text information is generated according to a speech; receiving audio information recorded by a second input device, wherein the audio information is generated and recorded according to the speech; performing speech recognition on the audio information to obtain second text information; and presenting the first text information and the second text information, wherein a correspondence relationship exists between content in the first text information and content in the second text information.

Another exemplary information processing method includes: receiving first text information through a first input device, in which the first text information is generated according to a speech; receiving audio information recorded by a second input device, wherein the audio information is generated and recorded according to the speech; sending the audio information or representation of the audio information to a server for performing, by the server, speech recognition; receiving second text information obtained by the speech recognition and fed back from the server; and presenting the first text information and the second text information, wherein a correspondence relationship exists between content in the first text information and content in the second text information.

Another exemplary information processing system includes: an input device configured to receive first text information input by a user, in which the first text information is generated according to a speech, an audio acquisition terminal configured to record audio information according to the speech, a network communication unit configured to send the audio information or representation of the audio information to a server for performing, by the server, speech recognition and configured to receive second text information obtained by the speech recognition and fed back from the server, and a display device configured to present the first text information and the second text information, wherein a correspondence relationship exists between content in the first text information and content in the second text information.

Another exemplary non-transitory computer-readable medium stores a set of computer program instructions that are executable by one or more processors of a device to cause the device to perform a method including: receiving first text information through a first input device, in which the first text information is generated according to a speech; receiving audio information recorded by a second input device, in which the audio information is generated and recorded according to the speech; sending the audio information or representation of the audio information to a server for performing, by the server, speech recognition; receiving second text information obtained by the speech recognition and fed back by the server; and presenting the first text information and the second text information, wherein a correspondence relationship exists between content in the first text information and content in the second text information.

Another exemplary information processing method includes: receiving audio information or representation of the audio information sent by a client; performing speech recognition on the audio information or the representation to obtain second text information; and sending the second text information to the client for presenting, by the client, the second text information and first text information of the client, wherein a correspondence relationship exists between content in the first text information and content in the second text information.

According to some embodiments of the present disclosure, electronic devices are provided. One exemplary electronic device includes: a network communication unit configured to: receive audio information or representation of the audio information sent by a client; and send second text information provided to the client for presenting, by the client, the second text information and first text information of the client, wherein a correspondence relationship exists between content in the first text information and content in the second text information; and a processor configured to cause the electronic device to perform speech recognition on the audio information or the representation to obtain and provide the second text information.

Another exemplary non-transitory computer-readable medium stores a set of computer program instructions that are executable by one or more processors of a device to cause the device to perform a method including: receiving audio information or representation of the audio information sent by a client; performing speech recognition on the audio information or the representation to obtain second text information; and sending the second text information to the client for presenting, by the client, the second text information and first text information of the client, wherein a correspondence relationship exists between content in the first text information and content in the second text information.

Another exemplary information processing method includes: receiving first text information generated according to a speech; receiving audio information recorded according to the speech; performing speech recognition on the audio information to obtain second text information; and performing typesetting according to a correspondence relationship between the first text information and the second text information, wherein the typeset first text information and second text information are used for presentation.

Another exemplary electronic device includes a processor configured to cause the electronic device to: receive first text information generated according to a speech; receive audio information recorded according to the speech; perform speech recognition on the audio information to obtain second text information; and perform typesetting according to a correspondence relationship between the first text information and the second text information, wherein the typeset first text information and second text information are used for presentation.

Another exemplary non-transitory computer-readable medium stores a set of computer program instructions that are executable by one or more processors of a device to cause the device to perform a method including: receiving first text information generated according to a speech; receiving audio information recorded according to the speech; performing speech recognition on the audio information to obtain second text information; and performing typesetting according to a correspondence relationship between the first text information and the second text information, wherein the typeset first text information and second text information are used for presentation.

Another exemplary information processing method includes: receiving first text information, which is generated according to a speech, input through a first input device; receiving audio information recorded by a second input device, wherein the audio information is generated and recorded according to the speech; recognizing the audio information to obtain second text information; presenting the first text information in a first region; and presenting the second text information in a second region, wherein a correspondence relationship exists between content in the first text information and content in the second text information, and the first region and the second region are located in the same interface.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

BRIEF DESCRIPTION OF THE DRAWINGS

In order to illustrate the technical solutions according to the embodiments of the present disclosure or in the prior art more clearly, the accompanying drawings required for describing the embodiments or the prior art are introduced briefly in the following. It would be obvious that the accompanying drawings in the following description are only some embodiments of the present disclosure. Those of ordinary skill in the art may further obtain other drawings according to the accompanying drawings without creative efforts.

FIG. 3 is a schematic diagram of an exemplary interface according to some embodiments of the present disclosure;

FIG. 4 is a schematic diagram of an exemplary interface according to some embodiments of the present disclosure;

FIG. 5 is a schematic diagram of an exemplary application scenario according to some embodiments of the present disclosure;

FIG. 6 is a schematic diagram of an exemplary interface according to some embodiments of the present disclosure;

FIG. 7 is a schematic diagram of an exemplary interface according to some embodiments of the present disclosure;

DETAILED DESCRIPTION

In order to enable those skilled in the art to better understand the technical solution in the present disclosure, the technical solution in the embodiments of the present disclosure will be clearly and fully described in the following with reference to the accompanying drawings in the embodiments of the present disclosure. It is obvious that the embodiments to be described are only a part rather than all of the embodiments of the present disclosure. All other embodiments obtained by those of ordinary skill in the art based on the embodiments in the present disclosure without creative efforts should fall within the scope of the present disclosure.

The implementation manners of this disclosure can generate a record conveniently. As can be seen from the technical solutions provided in the embodiments of the present disclosure, first text information and second text information can be obtained by manual input and speech recognition after audio recording respectively in the same speech scenario. The first text information is modified by using the characteristic that the second text information can record speech content comprehensively. As such, the first text information can be comprehensive and accurate and can highlight key points and concisely record the speech content. Compared with the second text information, the first text information can be more succinct and emphasize key points more, which can save reading time of readers.

Figure 20:
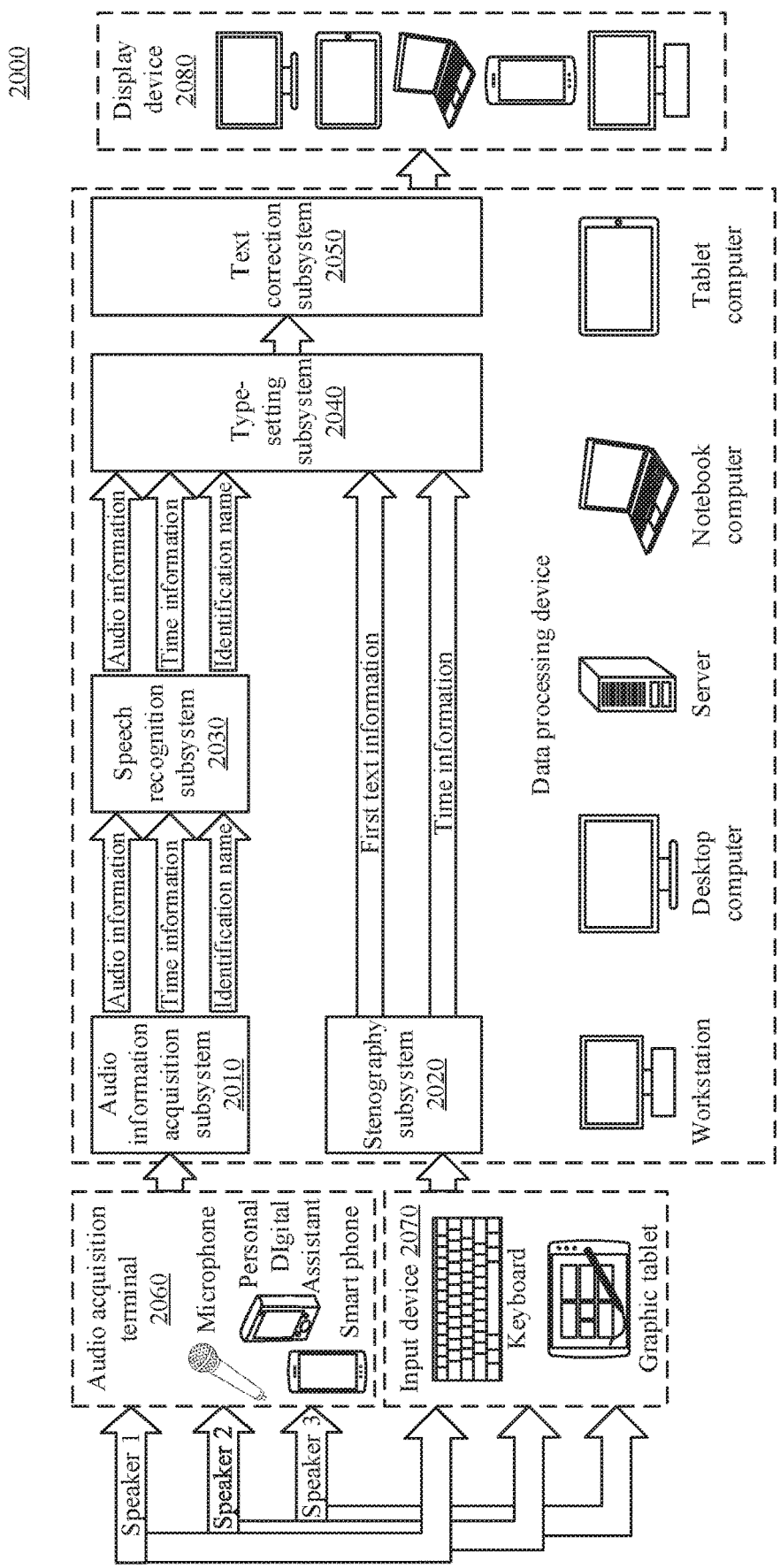
FIG. 20 is a schematic diagram of an exemplary information processing system according to some embodiments of the present disclosure.

Referring to FIG. 20, some embodiments of the present disclosure provide an information processing system 2000. The information processing system 2000 can include an audio information acquisition subsystem 2010, a stenography subsystem 2020, a speech recognition subsystem 2030, a typesetting subsystem 2040, and a text correction subsystem 2050.

In some embodiments, the audio information acquisition subsystem 2010 can receive audio information provided by an audio acquisition terminal 2060, and provide the audio information to the speech recognition subsystem 2030. The audio information acquisition subsystem 2010 can screen the audio information preliminarily to avoid sending multiple pieces of audio information recorded from the same speech to the speech recognition subsystem when multiple audio acquisition terminals 2060 exist. The audio information acquisition subsystem 2010 can compare waveforms of the audio information provided by the multiple audio acquisition terminals 2060 to determine whether there are two or more audio acquisition terminals 2060 collecting audio information that tends to be the same. When it is identified that the waveforms of the audio information provided by the two or more audio acquisition terminals 2060 tend to be the same, the audio information acquisition subsystem 2010 can provide the audio information with the largest waveform amplitude to the speech recognition subsystem 2030.

In this example, when multiple audio acquisition terminals 2060 are provided, the audio information acquisition subsystem 2010 can set an identification name corresponding to each audio acquisition terminal 2060. When sending the audio information to the speech recognition subsystem 2030, the audio information acquisition subsystem 2010 also sends the identification name of the audio acquisition terminal 2060 that acquires the audio information correspondingly. As such, the speech recognition subsystem 2030 can associate identified content with the identification name. Moreover, an audio acquisition terminal 2060 is usually arranged at a seat for use by the user in that seat. Therefore, a correspondence relationship exists between the identification name and the user.

In this example, the audio information acquisition subsystem 2010 can record a receiving time of the received audio information. When sending the audio information to the speech recognition subsystem, the audio information acquisition subsystem 2010 can send the receiving time together to the speech recognition subsystem 2030. It would be appreciated that the present disclosure is not limited to sending the receiving time and the audio information to the speech recognition subsystem 2030 together. In some embodiments, the generation time of the audio information and the audio information can also be sent to the speech recognition subsystem together 2030.

In this example, in a recording process, the audio information acquisition subsystem 2010 can regard all content in the recording process as a piece of audio information continuously. It is also possible that the audio information acquisition subsystem 2010 divides content in a recording process into multiple pieces of audio information. For example, the audio information can be divided according to the time length of the recording. For example, a piece of audio information is formed each time a record has been made for 20 milliseconds. It would be appreciated that in some embodiments, the audio information may not be limited to 20 milliseconds, and the specific time length can be selected from any values between 20 milliseconds to 500 milliseconds. Alternatively, the audio information can be divided according to a data volume. For example, the maximum data size for each piece of audio information can be 5 megabytes (MB). Alternatively, the audio information can be divided according to continuity of the sound waveform in the audio information. For example, a silence lasting a certain length of time may exist between two adjacent continuous waveforms. Each continuous sound waveform in the audio information is considered as a piece of audio information.

In this example, the stenography subsystem 2020 is configured to be provided to a recorder for input. That is, the recorder can input first text information, through his or her mental activity, to record the content of a speech according to the speech he or she hears. The stenography subsystem 2020 can receive the first text information input through an input device 2070 operated by the recorder. The stenography subsystem 2020 can provide the first text information input by the recorder to the typesetting subsystem 2040 for the typesetting subsystem 2040 to perform typesetting.

In this example, the stenography subsystem 2020 can record time information of the first text information. The time information can be the time when the input of the first text information starts or the time when the input of the first text information is completed. The stenography subsystem 2020 can provide the time information along with the first text information to the typesetting subsystem 2040.

In this example, the first text information can include the name of a corresponding speaker. As such, the first text information can present the identity of the speaker and the content more intuitively. Specifically, for example, the first text information can be "Xiao Ming says, 'Xiao Zhang owes me 100 dollars . . . '."

In this example, the speech recognition subsystem 2030 can perform speech recognition on the audio information to obtain second text information that represents the speech in the audio information.

In this example, the speech recognition subsystem 2030 can, according to a preset algorithm, acquire data from the audio information and output a feature matrix including characteristics of audio data in the audio information. A user's voice has its own characteristics, such as timbre, intonation, speed, etc. When the voice is recorded into the audio information, sound characteristics of each user can be reflected in aspects such as frequencies and amplitudes of audio data. Therefore, the feature matrix generated from the audio information according to the preset algorithm includes the characteristics of the audio data in the audio information. Further, a speech feature vector generated based on the feature matrix can be used to represent the audio information and the audio data. The preset algorithm can be Mel Frequency Cepstrum Coefficient (MFCC), Mel Frequency Spectral Coefficient (MFSC), Fractional Mel Frequency Cepstrum Coefficient (FMFCC), Discriminative Mel Frequency Cepstrum Coefficient (DMFCC), Linear Prediction Cepstrum Coefficient (LPCC), and so on. It would be appreciated that other algorithms can be adopted to realize the generation of the feature matrix of the audio information in light of the present disclosure, and such implementation should fall within the scope of the present disclosure as long as the function and effect achieved are the same as or similar to those disclosed in the present disclosure.

In this example, in order to further distinguish audio data of a user speech and audio data of a non-user speech in the audio information, in the method of generating the speech feature vector can also include an endpoint detection processing. Furthermore, data corresponding to the audio data of the non-user speech can be reduced in the feature matrix, so that a correlation between the generated speech feature vector and the user can be improved to some extent. The method of the endpoint detection processing can include, but is not limited to, endpoint detection based on energy, endpoint detection based on cepstrum features, endpoint detection based on an information entropy, endpoint detection based on a distance of auto-correlated similarity, etc., and will not be listed comprehensively herein.

In this example, the speech recognition subsystem 2030 can process the feature matrix by applying a speech recognition algorithm to obtain the second text information expressed in the audio information. Specifically, for example, the speech recognition algorithm can be a Hidden Markov Algorithm, a Neural Network Algorithm, etc., to perform speech recognition on the audio information.

In this example, after recognizing the second text information, the speech recognition subsystem 2030 can provide the recognized second text information to the typesetting subsystem 2040 for the typesetting subsystem 2040 to typeset the second text information and the first text information in a corresponding manner. In some cases, the speech recognition subsystem 2030 receives the time information, the identification name, or both, which are provided by the audio information acquisition subsystem 2010, corresponding to the audio information. The speech recognition subsystem 2030 can provide the time information, the identification name, or both along with the second text information to the typesetting subsystem 2040.

In this example, the typesetting subsystem 2040 can typeset the received first text information and second text information. Therefore, when being displayed on a display device 2080, the first text information and the second text information having a correspondence relationship to each other can be presented in a corresponding manner. The correspondence relationship includes, but is not limited to, for audio information and first text information that tend to be generated at the same time, the display position of the second text information of the audio information being adjacent to that of the first text information; or, for audio information and first text information that tend to be generated at the same time, the second text information of the audio information having the same display style as the first text information; or, for audio information and first text information that tend to be generated at the same time, the second text information of the audio information having a time label that tends to be adjacent to that of the first text information.

In this example, the text correction subsystem 2050 can be configured to receive modification to the first text information performed by the recorder to form a final text. The first text information is text information that the recorder inputs rapidly according to the content heard in the process of multi-person communication. The content of the first text information may be relatively brief but may not be comprehensive enough because of the limited input speed of the recorder and the ability to understand the multi-person communication. In some circumstances, some important content may be missing, or some content may be expressed inaccurately. The second text information is obtained by speech recognition according to the audio information in the process of multi-person communication, so that the second text information tends to comprehensively record the content of the multi-person communication. However, the second text information may be lengthy and not emphasizing key points enough. As such, after the typesetting subsystem 2040 typesets the first text information and the second text information, the recorder can compare the first text information with the corresponding second text information to modify the first text information. Therefore, the first text information can be concise and emphasize key points, with potential omissions or inaccurate expressions of important contents being corrected, so that the first text information can be improved.

Some embodiments of the present disclosure provide an information processing system. The information processing system can include an audio acquisition terminal and a client. In some embodiments, the information processing system includes an audio acquisition terminal, a client, and a server.

In this example, the audio acquisition terminal can be configured to record a speech of a user to generate the audio information, and provide the audio information to an audio information acquisition subsystem. The audio acquisition terminal can be an independent product having a housing and a microphone unit and a data communication unit installed in the housing. For example, the audio acquisition terminal can be a microphone. The microphone unit converts a sound signal into an electrical signal to obtain audio information, and the data communication unit can send the audio information to a processing subsystem. The data communication unit can be an interface of wired connection or a wireless communication module. Specifically, for example, the data communication unit can be a Bluetooth module, a Wi-Fi module, an audio socket, or the like. It would be appreciated that the audio acquisition terminal can also be integrated into a client with some data processing capabilities. For example, the client can include a smart phone, a tablet, a notebook computer, a personal digital assistant, and so on.

In some embodiments, the client can primarily include hardware such as a processor, a memory, and a display device. The client can have a powerful data processing capability. After generating a feature matrix for the audio information, the client can perform various processing, such as endpoint detection, noise reduction, speech recognition, and so on. Specifically, for example, the client can be a workstation, a well-configured desktop computer or notebook computer.

In this example, the client can run the audio information acquisition subsystem, the stenography subsystem, the speech recognition subsystem, the typesetting subsystem, and the text correction subsystem that are described above.

In some embodiments, the client can primarily include hardware such as a network communication unit, a processor, a memory, and a display device. The client can send the audio information to a server through the network communication unit. The client can also perform some processing on the audio information, such as generating the feature matrix and sending the feature matrix to the server, for the server to perform speech recognition on the content in the audio information. Specifically, for example, the client can include: a smart phone, a tablet, a desktop computer, a notebook computer, and so on.

In this example, the client can run the audio information acquisition subsystem, the stenography subsystem, the typesetting subsystem, and the text correction subsystem that are described above.

It would be appreciated that possible clients listed in the above are merely examples and are not meant to limit the present disclosure. With the development of science and technology, hardware performance can be improved, so that an electronic device with relatively poor data processing capability at present may have a powerful processing capability in the future.

In this example, the server can be an electronic device with some computing capabilities, and can have a network communication terminal, a processor, and a memory. It would be appreciated that the above server can also refer to software running on the electronic device. The above server can also be a distributed server, which can be a system operated cooperatively by multiple processors, memories, network communication modules, etc. Alternatively, the server can also be a server cluster formed by multiple servers.

In this example, the server can run the above speech recognition subsystem. The server can also run the typesetting subsystem and send the typeset data to the client.

Figure 1:
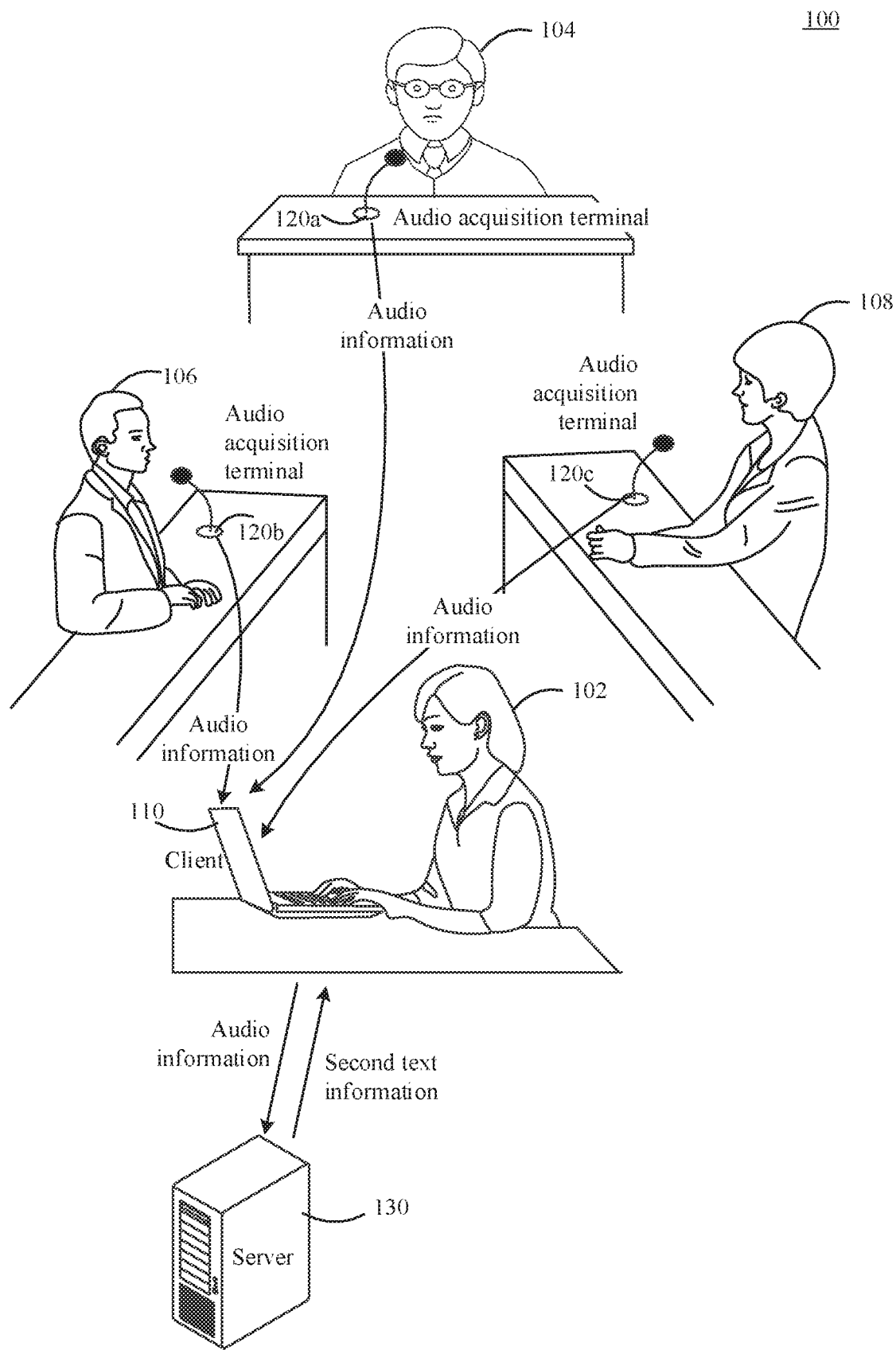
FIG. 1 is a schematic diagram of an example application scenario according to some embodiments of the present disclosure.
Figure 2:
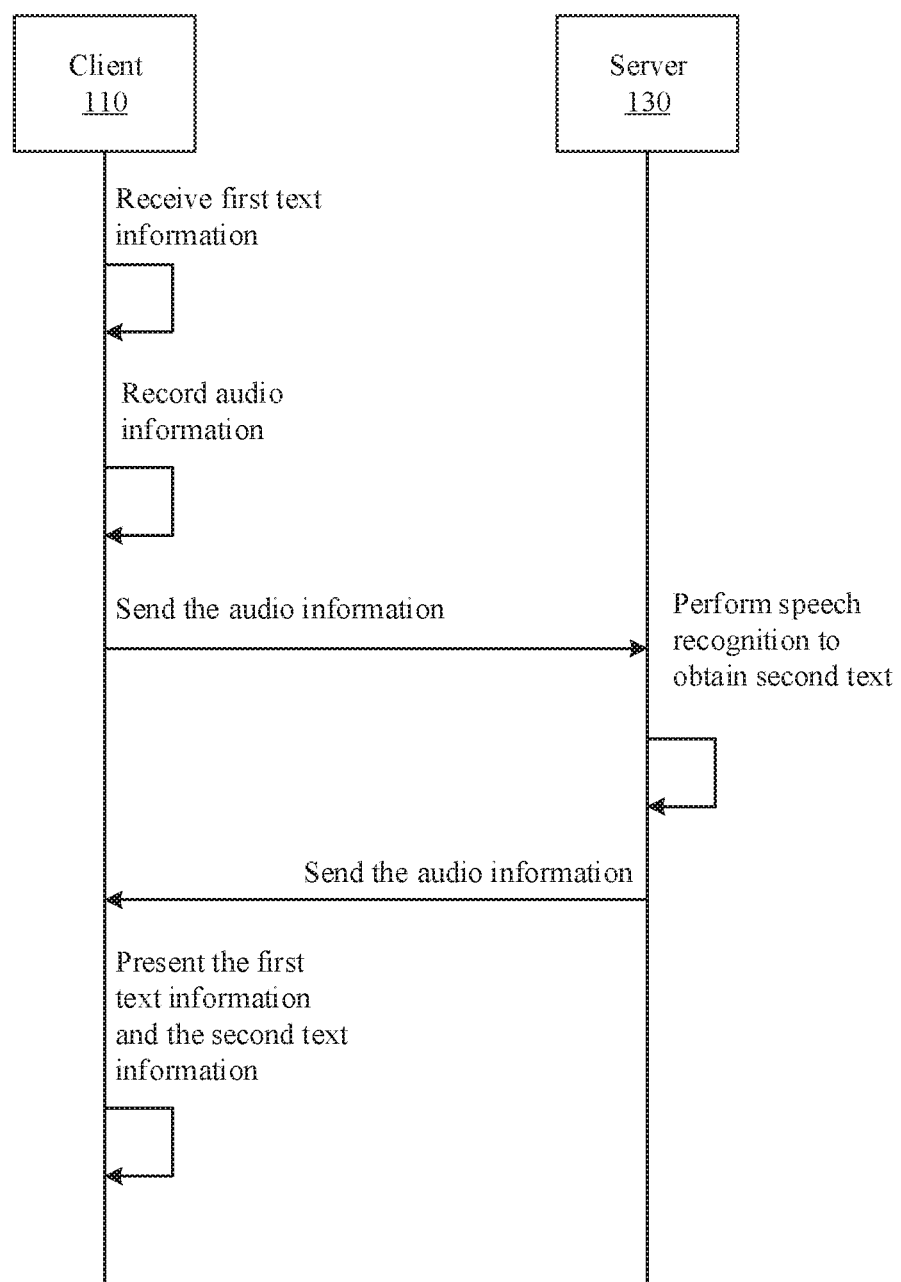
FIG. 2 is a schematic flowchart of an exemplary information processing method according to some embodiments of the present disclosure.

Reference is made to FIG. 1 and FIG. 2 together. In an exemplary scenario, in a court hearing scenario 100, a court clerk 102 can use a client 110, e.g., a desktop computer, to record speech content of the judge 104, the plaintiff 106, and the defendant 108 in the court hearing process. An audio acquisition terminal (e.g., acquisition terminals 102a, 102b, 102c) including a microphone is arranged at each of the seats of the judge 104, the plaintiff 106, and the defendant 108. The audio acquisition terminals 120a, 120b, 120c can communicate with the desktop computer through Bluetooth communication technology and input recorded audio information into the desktop computer. In some embodiments, the client 110 can send the audio information to a server 130 through network communication.

Reference is made to FIG. 3. In this exemplary scenario, the court clerk can use a keyboard to input the first text information into the desktop computer. The first text information can be the content expressed orally by the judge, the plaintiff, or the defendant and heard by the court clerk in the court hearing process, or the content refined by the court clerk according to the content expressed orally by the judge, the plaintiff, or the defendant. For example, the plaintiff Zhang San says, "I lent Li Si 5,000 dollars in April the year before last, and he promised to pay me back in two months. After two months, I went to him for it, but he put it off. Up to now, I have gone to him four times, but he has refused to pay me back with various excuses. As a matter of fact, I know that he has money. He even bought a car last month." The first text information recorded by the court clerk can be "the plaintiff Zhang San: 'He lent Li Si 5,000 dollars in April 2015, and it was agreed that the loan will be returned in June 2015. After the due date, Zhang San repeatedly urged Li Si to repay several times, but Li Si refused to repay. Zhang San thinks Li Si has the ability to repay the debt.'". The client may be configured to record the time when the court clerk starts to input the first text information, which is for example, 10:22:16.

In this exemplary scenario, the audio acquisition terminal disposed at Zhang San's seat can record the speech of Zhang San to form the audio information. The audio information is input to the client. The client can record the time of receiving the audio information, e.g., 10:22:20. The client can send the audio information, the receiving time, and an identification name "speaker 1" of the audio acquisition terminal to the server.

In this exemplary scenario, the server performs speech recognition and identity recognition on the received audio information to obtain second text information expressed in the audio information, that is, "I lent Li Si 5,000 dollars in April the year before last, and he promised to pay me back in two months. After two months, I went to him for it, but he put it off. Up to now, I have gone to him four times, but he has refused to pay me back with various excuses. As a matter of fact, I know that he has money. He even bought a car last month.". The server can associate the second text information with the identification name "speaker 1" of the audio acquisition terminal. The second text information fed back to the client can be "Speaker 1: I lent Li Si 5,000 dollars in April the year before last, and he promised to pay me back in two months. After two months, I went to him for it, but he put it off. Up to now, I have gone to him four times, but he has refused to pay me back with various excuses. As a matter of fact, I know that he has money. He even bought a car last month." The server can feed back the receiving time along with the second text information back to the client.

In this exemplary scenario, the client receives the second text information fed back by the server. By comparing the time of the audio information corresponding to the second text information with the time of the first text information, the client can display the first text information and the second text information adjacent in time, in a corresponding manner.

In this exemplary scenario, the first text information and the second text information are respectively presented in a single window. Displaying the first text information and the second text information in a corresponding manner may be displaying the corresponding first text information and second text information side by side horizontally.

In this exemplary scenario, when a trigger event occurs in the first text information or the second text information, such as the court clerk clicking on the first text information or the second text information with a mouse, the client can play back the corresponding audio information from which the second text information was generated.

Reference is made to FIG. 4. In this exemplary scenario, the court clerk can modify the first text information according to the second text information. In an initial record input by the court clerk, some contents may be omitted due to limited time, and can be modified according to the second text information. Specifically, for example, the court clerk may record "the plaintiff Zhang San: 'He lent Li Si 5,000 dollars in April 2015, and it was agreed that the loan will be returned in June 2015. After the due date, Zhang San repeatedly urged Li Si to repay several times, but Li Si refused to repay. Zhang San thinks Li Si has the ability to repay the debt.'". In the first text information recorded by the court clerk, the number of times Zhang San asked Li Si for repayment and the fact that Li Si could afford to buy a car were omitted, when compared with the second text information obtained by speech recognition. By comparing the first text information with the second text information, the court clerk can modify the first text information as "the plaintiff Zhang San: 'He lent Li Si 5,000 yuan in April 2015, and it was agreed that the loan will be returned in June, 2015. After the due date, Zhang San urged Li Si four times to repay, but Li Si refused to repay. Zhang San thinks Li Si has the ability to repay the debt, because Li Si bought a car in June 2017.'".

In this exemplary scenario, by presenting the first text information and the second text information in a corresponding manner, the client brings the convenience to the court clerk for modifying the first text information. The court clerk can print a court record formed from the first text information in the end. As such, the court record can be more comprehensive and accurate, concise in language and emphasize key points more.

Reference is made to FIG. 5 together. In an exemplary scenario, in a meeting 500, a client 510 used by a meeting recorder 502 can be a notebook computer. The notebook computer is integrated with a microphone through which speeches of participants 504, 506, 508 during the meeting can be recorded into the audio information.

In this exemplary scenario, the meeting recorder 502 can input the first text information by using the keyboard of the notebook computer. The first text information can be speech contents of the meeting participants 504, 506, 508 heard by the meeting recorder, or the content summarized by the meeting recorder 502 according to speeches or discussions of the meeting participants 504, 506, 508. Specifically, for example, in a meeting discussion, Wang Wu said, "This is an urgent project, so we should pay close attention to the progress. We need to complete the project acceptance before the end of the year, so we need to hurry up. Can the R&D department provide a complete design scheme this month?". Ding Qi said, "We are unable to provide a complete design scheme by the end of this month. We only have a preliminary design scheme for now and it is only possible to provide a more complete design scheme after purchasing raw materials and performing a preliminary verification. Therefore, the specific time to provide a complete design scheme depends on when the purchase of raw materials can be completed." Qian Ba said, "We can complete the purchase of raw materials by the end of this month." Ding Qi said, "If the raw materials are available by the end of this month, we should be able to provide a complete design scheme by the middle of next month." Wang Wu said, "OK. Let's have the purchasing department complete the purchase of raw materials by the end of this month, and the R&D department provide a complete design scheme by the middle of the next month."

Reference is made to FIG. 6 together. In this exemplary scenario, the first text information recorded by the meeting recorder can include "Wang Wu said, 'This is an urgent project, so all departments need to speed up the progress'," "Qian Ba said, 'The purchase of raw materials requested by the R&D department can be completed in this month.'," "Ding Qi said, 'If the purchasing department is able to complete the purchase of raw materials this month, we should be able to provide a complete design scheme in the next month.'"

In this exemplary scenario, the client records the audio information based on speeches of participants during the meeting. The client can perform speech recognition and identity recognition on the audio information to obtain second text information expressed in the audio information and identity information corresponding to the second text information. At the beginning of the meeting, the meeting participants can first register at the client, and the client records the audio information of the meeting to generate a user feature vector identifying each participant, and receives the input identity information. As such, the identity information corresponding to the second text information can be obtained by matching a speech feature vector of the audio information with the user feature vector during the meeting.

In this exemplary scenario, the second text information obtained by the client according to the speech recognition on the audio information can include: "Wang Wu said, 'This is an urgent project, so we should pay close attention to the progress. We need to complete the project acceptance before the end of the year, so we need to hurry up. Can the R&D department provide a complete design scheme this month?'". "Ding Qi said, 'We are unable to provide a complete design scheme by the end of this month. We only have a preliminary design scheme for now and it is only possible to provide a more complete design scheme after purchasing raw materials and performing a preliminary verification. Therefore, the specific time to provide a complete design scheme depends on when the purchase of raw materials can be completed.'," "Qian Ba said, 'We can complete the purchase of raw materials by the end of this month.'," "Ding Qi said, 'If the raw materials are available by the end of this month, we should be able to provide a complete design scheme by the middle of next month.'," "Wang Wu said, 'OK. Let's have the purchasing department complete the purchase of raw materials by the end of this month, and the R&D department provide a complete design scheme by the middle of the next month.'"

Reference is made to FIG. 7 together. In this exemplary scenario, the client can obtain the second text information corresponding to the first text information by semantic analysis. The meeting recorder can modify the first text information according to the content of the second text information. For example, "This is an urgent project, so all departments need to speed up the progress" is modified as "This is an urgent project, and all departments need to speed up the progress in order to complete the project acceptance at the end of the year," and "if the purchasing department is able to complete the purchase of raw materials this month, we should be able to provide a complete design scheme in the next month" is modified as "if the purchasing department is able to complete the purchase of raw materials this month, we should be able to provide a complete design scheme by the middle of the next month."

In this exemplary scenario, after the meeting recorder finishes modifying the first text information in the meeting record, a meeting record formed by the first text information is sent in e-mails to the meeting participants.

Figure 8:
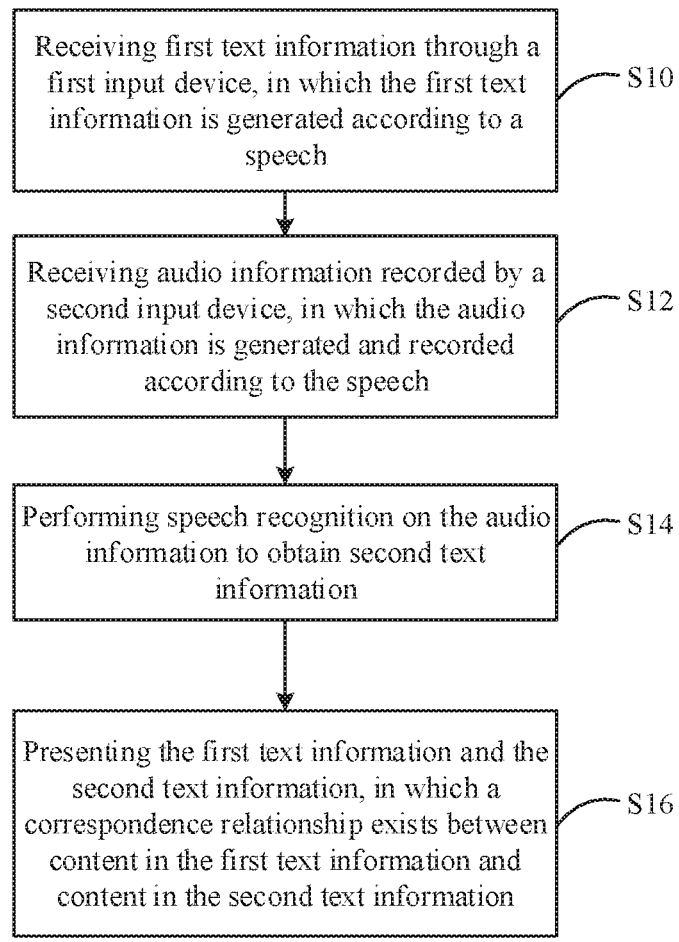
FIG. 8 is a schematic flowchart of an exemplary information processing method according to some embodiments of the present disclosure.

Reference is made to FIG. 8. An information processing method 800 is provided in some embodiments of the present disclosure. The information processing method 800 can be applied in a client. The information processing method 800 can include the following steps.

In step S10, a client receives first text information generated according to a speech and input through a first input device. In this example, the first input device can be operated by a user to implement receiving a user input by the client. The first input device can be a peripheral connected to the client, such as a keyboard, a mouse, a writing tablet, etc. The first input device can also be a touch display, which provides the user with a touch input function.

In this example, the first text information may be text expressing what the user heard in the speech based on the user's understanding. Specifically, in a multi-person meeting, for example, the meeting recorder uses a keyboard to type the text message based on the content he or she listened to in the communication.

In this example, receiving the first text information can be achieved by providing the first text information to the client by the user through the first input device. As such, the first text information can be generated by the user through his or her mental activity.

In this example, the first text information is generated according to a speech, which can be input to the client by the user, through his or her mental activity, according to the speech heard by the user. As such, the first text information can include the content heard and extracted by the user, the content based on the user's understanding, a direct explanation by the user to the content heard, and the like.

In this example, the first text information can be a sentence, or a paragraph. In the process of a multi-person communication, there may be more than one person speaking, and the final record finalized by the recorder can include multiple pieces of the first text information. Specifically, for example, a speech of one participant input by the recorder can be taken as a piece of first text information. Alternatively, a single sentence extracted by the recorder according to opinions expressed by multiple meeting participants can be taken as a piece of first text information. Alternatively, the recorder can record the content of the speech made by a participant and divide it into multiple paragraphs, and each of the paragraphs constitutes a piece of the first text information. It would be appreciated that those skilled in the art can also make other modifications in light of the technical essence of this example, and those modifications should fall within the scope of the present disclosure as long as their functions and effects are the same or similar to those disclosed in the present disclosure.

In step S12, the client receives audio information, in which the audio information is generated and recorded by a second input device according to the speech. In this example, the second input device can be an audio acquisition terminal. The second input device can be a microphone disposed inside the client or a microphone connected to the client, by connecting to a peripheral device. Specifically, for example, a microphone can be integrated in a notebook computer. For another example, a desktop computer can connect to an external microphone via a universal serial bus (USB) or a microphone interface.

In this example, steps S10 and S12 may be performed without a particular order. Specifically, for example, in the court hearing, both the plaintiff and the defendant can have microphones, and when the plaintiff or the defendant speaks, the microphones can record corresponding audio information. During this process, the court clerk inputs the first text information to the client through the keyboard based on the speech of the plaintiff or of the defendant.

In step S14, the client performs speech recognition on the audio information to obtain second text information. In this example, the second text information can be the content obtained by the client based on speech recognition. As such, a record formed from the second text information can become a comprehensive record of conversation content of the speech in the audio information.

In this example, the second text information can be a sentence or a paragraph. Specifically, for example, a piece of second text information can be generated according to a piece of audio information. Alternatively, a sentence can be formed based on the recognized words and serve as a piece of second text information. Alternatively, contents with similar expression in adjacent contexts can be taken as a piece of second text information. Alternatively, the content of a single speech of a user can be taken as a piece of second text information in combination with the identity recognition.

In step S16, the client presents the first text information and the second text information, in which a correspondence relationship exists between content in the first text information and content in the second text information. In this example, the client can present the first text information and the second text information through a display device, so that the user can acquire it easily. As the second text information is generated by the speech recognition according to the audio information, it can comprehensively record the content of the audio information. Accordingly, the user can modify the content of the first text information with reference to the second text information. Specifically, for example, during or after the court hearing, the court clerk can use the second text information obtained from the speech recognition performed on the audio information of the plaintiff or of the defendant to modify the first text information recorded by the court clerk himself or herself. Thus, the first text information can be more accurate, bringing convenience to the court clerk.

In this example, the correspondence relationship can be realized in various ways. For example, in some embodiments, display positions of the first text information and the second text information that tend to be generated at the same time can be relatively close to each other. Alternatively, in some embodiments, the first text information and the second text information that tend to be generated at the same time can have the same display style. Alternatively, in some embodiments, the first text information and the second text information that tend to be generated at the same time can have time labels that tend to be close. Alternatively, in some embodiments, for the audio information and the first text information that tend to be generated at the same time, display positions of the second text information of the audio information and the first text information can be relatively close to each other. Alternatively, in some embodiments, for the audio information and the first text information that tend to be generated at the same time, the second text information of the audio information and the first text information can have the same display style. Alternatively, in some embodiments, for the audio information and the first text information that tend to be generated at the same time, the second text information of the audio information and the first text information can have time labels that tend to be close. Alternatively, in some embodiments, the first text information and the second text information that tend to express the same semantics can be displayed at display positions close to each other, or have the same display style.

In this example of the present disclosure, the first text information and the second text information can be respectively obtained by manual input and speech recognition after audio recording in the same speech scenario. The first text information can be modified by utilizing the characteristic that the second text information can comprehensively record speech content. Thus, the first text information can be more comprehensive and accurate, with key points highlighted and the speech content recorded concisely. Compared with the second text information, the first text information can be more succinct and emphasize key points more, which saves the time of readers.

Figure 9:
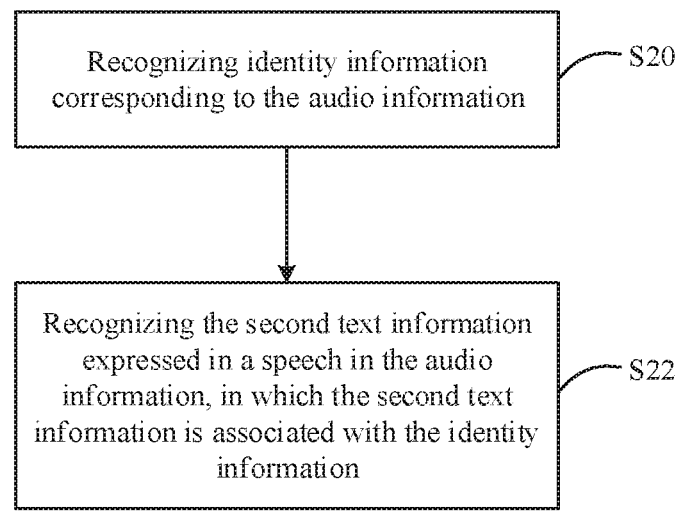
FIG. 9 is a schematic flowchart of an exemplary information processing method according to some embodiments of the present disclosure.

Reference is made to FIG. 9. In some embodiments, the step S14 of the speech recognition can include following sub-steps S20, and S22.

In step S20, the client recognizes identity information corresponding to the audio information.

In step S22, the client recognizes the second text information expressed in a speech in the audio information, in which the second text information is associated with the identity information.

In the presenting step stated above, the identity information and the corresponding second text information can be presented in a corresponding manner.

In this example, a feature matrix can be generated according to the audio information. Then, a dimension reduction is performed to the feature matrix based on multiple feature dimensions to obtain multiple dimension values for representing the feature dimensions. The multiple dimension values form the speech feature vector. The speech feature vector can be used to identify each user.

In this example, the dimension reduction can be performed to the feature matrix according to different feature dimensions to obtain dimension values that can represent the feature dimensions. Further, the dimension values are arranged in a designated order to form a speech representation vector of the audio information. Specifically, the dimension reduction can be performed to the feature matrix by a convolution algorithm or a mapping algorithm. In a specific example, the dimension reduction can be performed to the feature matrix based on different dimensions using a Deep Neural Network (DNN), a Convolutional Neural Network (CNN), a Recurrent Neural Network (RNN), deep learning, any possible combinations of the above algorithms, or the like.

In this example, the audio information acquired may be a recording of the user's speaking voice. As such, the speech representation vector generated according to the audio information can correspond to the audio information represented and can also represent part of voice characteristics of the user. The speaking voice of each user has certain voice characteristics due to the user's own growth and development process. Accordingly, different users can be distinguished according to the voice characteristics of each user. Therefore, the speech representation vector can be used to identify a user by representing part of the voice characteristics of the user.

In this example, there can be one or more pieces of the audio information acquired for the user. A corresponding speech feature vector can be generated corresponding to each piece of audio information using an audio information processing method. It would be appreciated that, in some cases, operation processing can be performed to more than one piece of audio information synchronously based on the audio information processing method to obtain the speech feature vector. In that case, the speech feature vector can correspond to the more than one piece of audio information.

In this example, a user characteristic vector used to identify a user can be determined according to the obtained speech feature vector. Specifically, for example, if only one speech feature vector is generated, the speech feature vector can be used as the user characteristic vector of the user. If multiple speech feature vectors are generated, a speech feature vector expressing relatively more speech characteristics of the user can be selected from the multiple speech feature vectors as the user characteristic vector of the user. If multiple speech feature vectors are generated, the user characteristic vector of the user can further be outputted by performing operation processing to some or all of the multiple speech feature vectors. The operation processing can include, but is not limited to, calculating the sum of the multiple speech feature vectors in a corresponding dimension and then further calculating a mean. It would be appreciated that, other algorithms may also be applied, such as calculating a weighted sum of the multiple speech feature vectors during the operation processing.

In this example, the speech feature vector is matched with the user characteristic vector. When there is a successful match, personal information associated with the user characteristic vector is taken as the identity information of the user. Specifically, the method of matching the speech feature vector with the user characteristic vector can include performing calculation according to the two vectors. It can be considered that there is a successful match when the two vectors satisfy a certain relationship. Specifically, for example, a difference between the two vectors can be calculated. Then, the sum of the elements of the difference vector can be calculated, and the value obtained is taken as a matching value. The matching value is compared with a set threshold, and it is considered that the speech feature vector is successfully matched with the user characteristic vector when the matching value is less than or equal to the set threshold. Alternatively, the sum of the speech feature vector and the user characteristic vector can also be calculated directly, and the value obtained is taken as a matching value. It is considered that the speech feature vector is successfully matched with the user characteristic vector when the matching value is greater than or equal to a set threshold.

In this example, in the step of recognizing identity information of the user, audio information of the user can be acquired first and then personal information is entered. As such, a speech feature vector can be generated according to the audio information, and then the entered personal information can be associated with the speech feature vector. The second text information obtained by the speech recognition can be associated with the identity information of the user who gives the speech, so that the identity information and the second text information can be presented in a corresponding manner when being presented. Specifically, the association can be stored correspondingly, or one of the identity information and the second text information can be determined according to the other one of the identity information and the second text information. Specifically, for example, personal information can be a user's name, nickname, role or the like. The role can be plaintiff or defendant. It is also possible to automatically assign an identification name to the user and associate the identification name with the speech feature vector without entering the personal information. The second text information obtained by the speech recognition can be associated with the identification name of the user giving the speech, so that the identification name and the second text information can be presented in a corresponding manner when being presented. Specifically, for example, the identification name can be "user 1".

In this example, the identity information and the second text information are presented in a corresponding manner to facilitate users to view persons involved in the record and the speeches of the corresponding persons. The corresponding manner for presentation can be displaying the identity information at the beginning or the end of the second text information.

Figure 10:
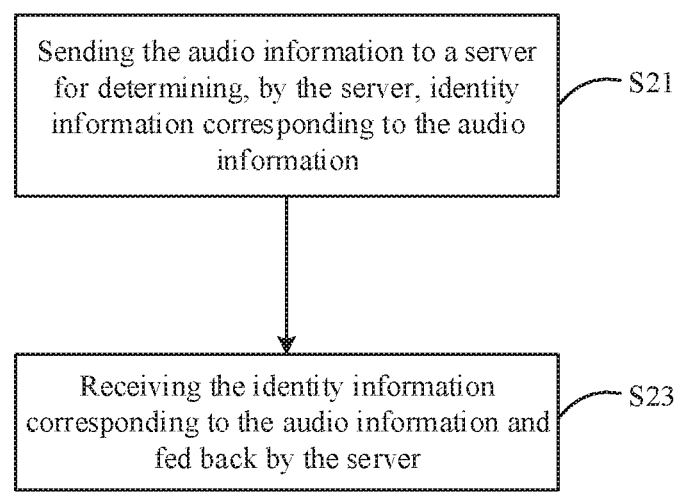
FIG. 10 is a schematic flowchart of an exemplary information processing method according to some embodiments of the present disclosure.

Reference is made to FIG. 10. In some embodiments, the information processing method 800 can further include the following steps S21 and S23.

In step S21, the audio information is sent to a server for determining, by the server, identity information corresponding to the audio information.

In step S23, the identity information corresponding to the audio information fed back by the server is received.

Accordingly, the identity information and the corresponding second text information are presented in a corresponding manner in the presenting step.

In this example, the server can complete the recognition of the identity information corresponding to the audio information. The user can register at the server in advance, so that a user characteristic vector corresponding to the identity information of the user is stored in the server. The server can generate a speech feature vector according to the received audio information and match it with the stored user characteristic vectors. Thus, the server can determine the user characteristic vector that corresponds to the speech feature vector, and obtain the identity information corresponding to the audio information. It is noted that the server can also, without any pre-registered user characteristic vector, generate a speech feature vector of each piece of audio information after receiving the audio information. The server can cluster multiple speech feature vectors, and aggregate speech feature vectors of speech belonging to one user into one data set, thereby obtaining a user characteristic vector that can represent the user. For the identity information of each user, an identification name of the user can be assigned to the user characteristic vector according to an established naming rule. Each user characteristic vector can correspond to an identification name.

In some embodiments, the step of presenting the first text information and the second text information or the step of typesetting the first text information and the second text information can include: associating the first text information and the audio information received in adjacent time, to present, in a corresponding manner, the first text information and the second text information that is obtained by recognizing the audio information.

In this example, the client can record the receiving time when it receives the first text information entered by the user. When the generated audio information is received, the receiving time of the audio information can also be recorded. The receiving time of the audio information can also be interpreted as the generation time of the audio information.

In this example, the first text information being corresponding to the audio information, can be that the contents expressed by the first text information and by the audio information tend to have the same semantic meaning. Specifically, the first text information and the audio information that tend to be received at the same time may have a greater likelihood of expressing the same semantic meaning. As such, the first text information and the second text information are presented in a corresponding manner to facilitate the modification by comparing the first text information with the second text information. Specifically, for example, when multiple users are communicating in a meeting, a meeting recorder can record the content of a user's speech after hearing it and can generate the first text information. At this point, the microphone can record the speech of the user into audio information. As can be seen, the time when the meeting recorder inputs the first text information can be close to the time when the microphone records and generates the speech, both of which are aimed at a user's speech in the meeting. So, a correspondence relationship exists between the first text information and the second text information.

In this example, the method of presenting the first text information and the second text information in a corresponding manner can include: respectively displaying the first text information and the second text information in positions close to each other in a window, such as displaying them as two adjacent paragraphs of texts. Alternatively, the first text information and the second text information can be presented in two windows horizontally side by side. Alternatively, the first text information and the second text information can have the same display style, such as font, size, color, background color, etc.

In some embodiments, the step of presenting the first text information and the second text information or the step of typesetting the first text information and the second text information can include: performing semantic matching on the first text information with the second text information of the audio information that is generated within a designated time frame to obtain the second text information corresponding to the first text information.

In this example, the first text information is entered by the user according to the speech heard, while the second text information is obtained by the speech recognition on the audio information. Therefore, the first text information and the second text information are both generated according to the conversation or speech of the user in the same scenario. So, the first text information and the second text information are, in a certain level, consistent with each other semantically. The first text information and the second text information can be semantically analyzed and matched to obtain the second text information which is semantically close to the first text information. The obtained second text information can be taken as the second text information corresponding to the first text information.

In this example, the manner of performing semantic matching can include: performing word segmentation on the first text information, obtaining words included in the first text information by segmentation, and comparing the obtained words in the first text information with the second text information. Accordingly, the second text information that includes a maximum number of the words of the first text information can be taken as the second text information corresponding to the first text information. Alternatively, the second text information that includes a maximum number of synonyms of the words of the first text information can be taken as the second text information corresponding to the first text information/Alternatively, the second text information that includes a maximum number of the words and synonyms of the words of the first text information can be taken as the second text information corresponding to the first text information.

In this example, in order to reduce the computation burden, a time frame can be designated for matching the first text information with the second text information of the audio information generated within the time frame. The time frame can be close to the time when the first text information is generated. The time frame can include or not include the time when the first text information is generated. In some embodiments, the step of performing semantic matching further includes: setting a reference time as the time when the first text information is received; and setting the designated time frame according to the reference time. The reference time is within the designated time frame. As such, the designated time frame can include the time of receiving the first text information, so that the time of sound information is close to the time of generating the first text information. Thus, the speed of matching the second text information corresponding to the first text information can be improved, and thus the required time and the amount of computation can be both reduced.

Figure 11:
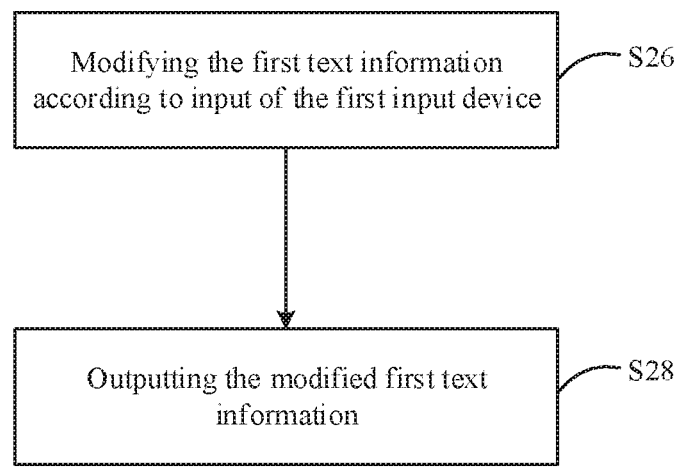
FIG. 11 is a schematic flowchart of an exemplary information processing method according to some embodiments of the present disclosure.

Reference is made to FIG. 11. In some embodiments, the information processing method 800 can further include the following steps S26, S28.

In step S26, the first text information is modified according to input from the first input device.

In this example, after the first text information and the second text information are presented, the user can modify the first text information according to the content of the second text information. As such, the accuracy and comprehensiveness of the first text information can be further improved on the basis of the characteristics of manual records such as being concise in language and emphasizing key points. Furthermore, it also brings convenience to the producer of the records.

This example can further include step S28. In step S28, the modified first text information is outputted.

In this example, outputting the modified first text information can be sending the first text information to a printing device or sending the first text information via an e-mail.

In some embodiments, the information processing method can further include: when a triggering event occurs in the first text information or the second text information, playing back the audio information corresponding to the first text information or the second text information where the triggering event occurs.

In this example, the triggering event can be a click or swipe operation received by the client. Specifically, for example, the user clicks on the first text information or the second text information with a mouse, or moves the mouse hovering over the first text information or the second text information; or, the user performs a touch click operation on a touch display device.

In this example, a triggering event occurring in the first text information or the second text information can be a triggering event occurring in a region where the first text information or the second text information is displayed. Alternatively, when a click operation occurs in a play button provided corresponding to the first text information or the second text information, it can also be determined that a triggering event occurs in the corresponding first text information or second text information.

In this example, the manner in which the first text information corresponds to the audio information can be referenced through descriptions in other embodiments, and further explanation is not repeated herein for the sake of brevity. The audio information corresponding to the second text information can be the audio information that is used to obtain the second text information by performing recognition.

In some embodiments, the information processing method can further include: displaying, with a designated style, second text information corresponding to the first text information when the triggering event occurs in the first text information; or displaying, with a designated style, first text information corresponding to the second text information when the triggering event occurs in the second text information.

In this example, the designated style can include, but is not limited to, font, size, color, background color, bold text, italic text, underline text, and so on.

In this example, when a triggering event occurs in the first text information, the corresponding second text information is displayed with a designated style, which can intuitively indicate the correspondence relationship between them, and can also facilitate the user to check and compare. The designated style can be different from the style of the rest of the text, so that the display state of the corresponding text information is different from other text, which brings convenience to the user. Similarly, when the second text information is triggered, the first text information is displayed with a designated style.

Figure 12:
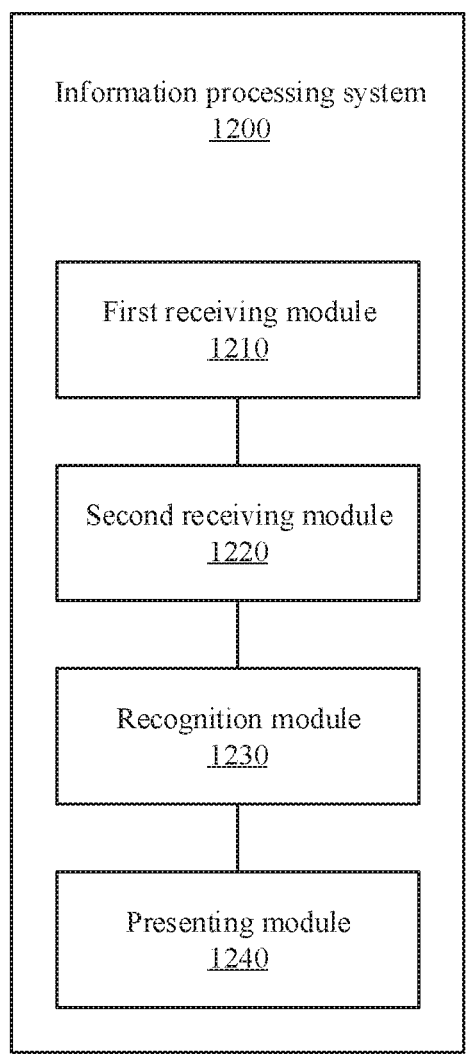
FIG. 12 is a schematic diagram of modules of an exemplary electronic device according to some embodiments of the present disclosure.

Reference is made to FIG. 12. Some embodiments of the present disclosure further provide an information processing system 1200. The information processing system 1200 can include the following modules 1210, 1220, 1230, and 1240.

A first receiving module 1210 is configured to receive first text information generated according to a speech and input through a first input device.

A second receiving module 1220 is configured to receive audio information recorded by a second input device. The audio information is generated and recorded according to the speech.

A recognition module 1230 is configured to perform speech recognition on the audio information to obtain second text information.

A presenting module 1240 is configured to present the first text information and the second text information. A correspondence relationship exists between content in the first text information and content in the second text information.

In this example, the functions and effects achieved by the electronic device can be explained with reference to other embodiments, and thus are not repeatedly described in detail here for the sake of brevity.

Figure 13:
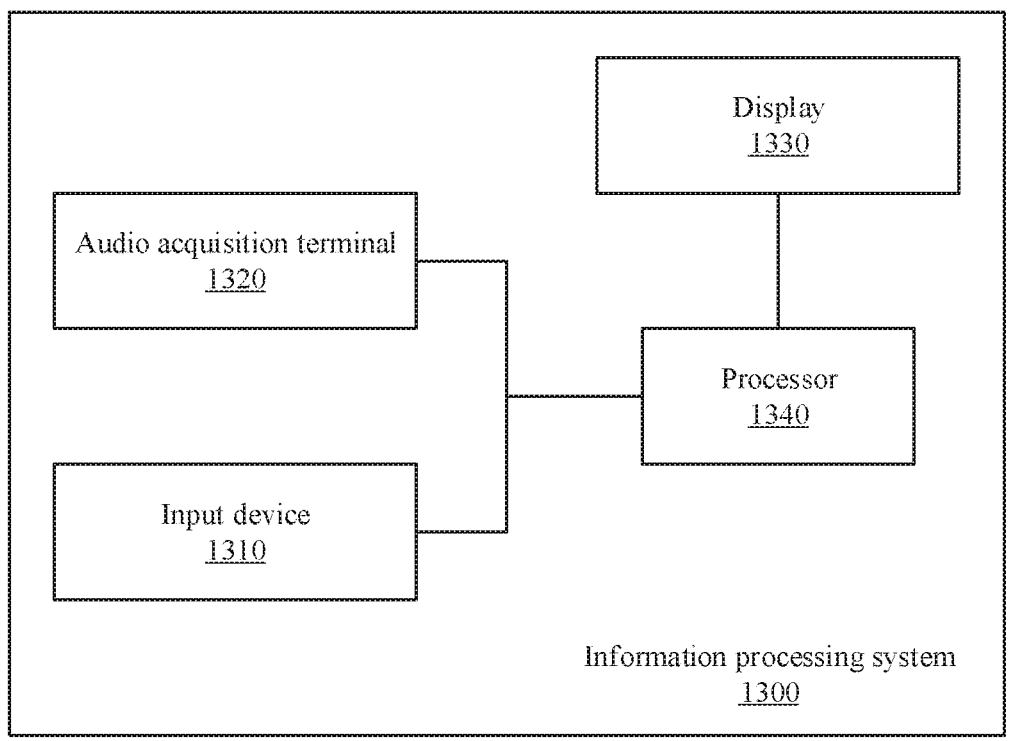
FIG. 13 is a schematic architectural diagram of an exemplary electronic device according to some embodiments of the present disclosure.

Reference is made to FIG. 13. Some embodiments of the present disclosure further provide an information processing system 1300. The information processing system 1300 can include: an input device 1310, an audio acquisition terminal 1320, a display device 1330, and a processor 1340.

The input device 1310 is configured to receive first text information input by a user according to a speech.

The audio acquisition terminal 1320 is configured to record audio information according to the speech.

The processor 1340 is configured to perform speech recognition on the audio information to obtain second text information.

The display device 1330 is configured to present the first text information and the second text information. A correspondence relationship exists between content in the first text information and content in the second text information.

In this example, the input device 1310 can be a device with an information input function. For example, the input device 1310 can be a keyboard, a graphic tablet, a stylus, and the like. It would be appreciated that the input device is not limited to those listed above.

In this example, the audio acquisition terminal 1320 includes a microphone. The microphone can be an energy conversion device that converts a sound signal into an electrical signal. Specifically, for example, the microphone can be specifically designed as, but is not limited to, an electric microphone, a capacitive microphone, a piezoelectric microphone, an electromagnetic microphone, a carbon grain microphone, a semiconductor microphone, and so on.

In this example, the processor 1340 can be implemented in any appropriate manner. For example, the processor can be in the form of a microprocessor or a processor, and a computer readable medium, a logic gate, a switch, an Application-Specific Integrated Circuit (ASIC), a programmable logic controller or an embedded microcontroller that stores computer readable program codes (e.g., software or firmware) executable by the microprocessor or the processor.

In this example, the display device 1330 can provide an interface display. Specifically, for example, the display device 1330 can include Cathode Ray Tube (CRT) displays, Plasma Display Panels, Liquid Crystal Displays, Light Emitting Diode (LED) Panels, and so on, which are classified according to different manufacturing materials. It would be appreciated that the display device is not limited to a flat panel display. For example, the display device 1330 can also be a curved display, a stereoscopic display, and so on.

The information processing system 1300 provided in this example can be explained with reference to other embodiments.

Some embodiments of the present disclosure further provide a computer storage medium storing a set of computer program instructions. In some embodiments, the computer storage medium can be a non-transitory computer-readable medium. Computer program instructions stored in the computer storage medium are executable by one or more processors of a device to cause the device to perform a method, and the method includes: receiving first text information generated according to a speech and input through a first input device; receiving audio information recorded by a second input device, in which the audio information is generated and recorded according to the speech; performing speech recognition on the audio information to obtain second text information; and presenting the first text information and the second text information, in which a correspondence relationship exists between content in the first text information and content in the second text information.

In this example, the computer storage medium includes, but is not limited to, a Random Access Memory (RAM), a Read-Only Memory (ROM), a cache, a Hard Disk Drive (HDD) or a memory card.

The functions and effects achieved when the set of computer program instructions of the computer storage medium provided in this example is executed can be explained with reference to other embodiments.

Figure 14:
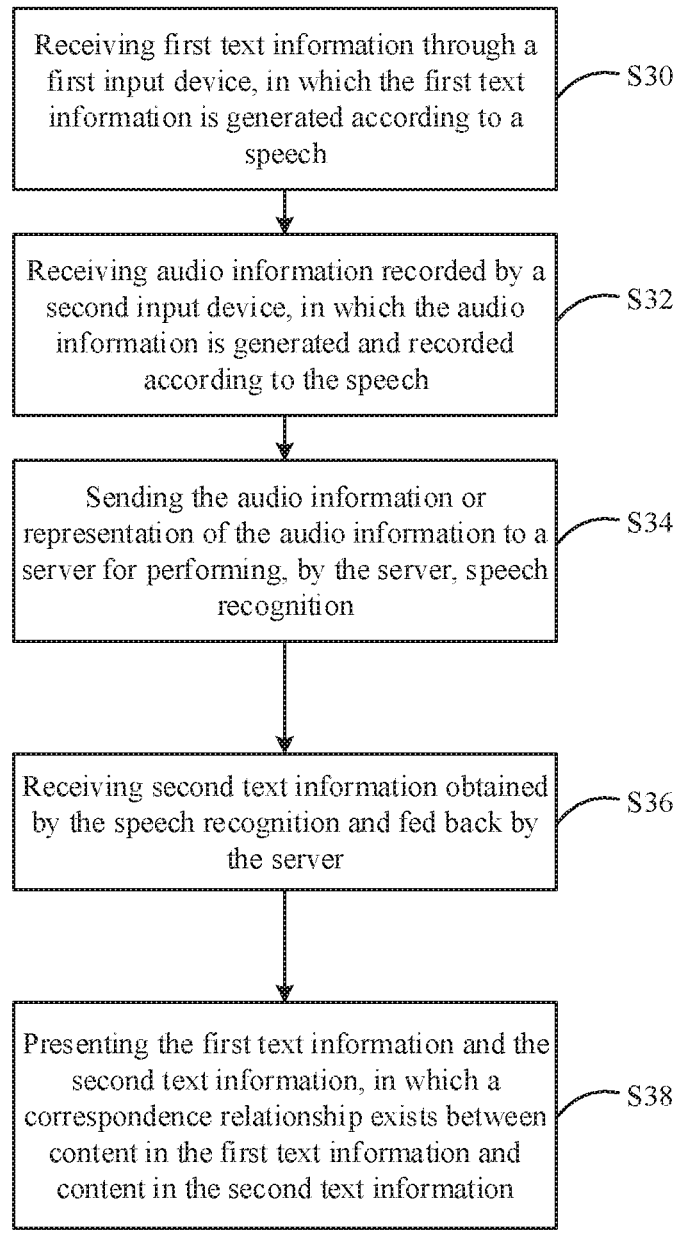
FIG. 14 is a schematic flowchart of an exemplary information processing method according to some embodiments of the present disclosure.

Reference is made to FIG. 14. Some embodiments of the present disclosure further provide an information processing method 1400. The information processing method 1400 can include following steps S30, S32, S34, S36 and S38.

In step S30, first text information generated according to a speech and input through a first input device is received.

In step S32, audio information is received, in which the audio information is generated and recorded by a second input device according to the speech.

In step S34, the audio information or representation of the audio information is sent to a server for performing, by the server, speech recognition.

In step S36, second text information obtained by the speech recognition and fed back by the server is received.

In step S38, the first text information and the second text information are presented, in which a correspondence relationship exists between content in the first text information and content in the second text information.

In this example, the client can send the audio information to the server, and the server can perform speech recognition on the audio information. The server can send the second text information obtained by the speech recognition to the client, so that the client can present the first text information and the second text information. In this example, the processing on the audio information by the server can be explained with reference to other embodiments, which is not repeatedly described in detail here for the sake of brevity.

In this example, the client and the server can perform data transmission based on a network communication protocol. The network communication protocol includes, but is not limited to, HTTP, TCP/IP, FTP, and so on.

In this example, the representation can be generated by calculation according to the audio information, and can be used to represent the audio information. Specifically, for example, the representation can be a feature matrix generated according to the audio information, or data after performing endpoint detection on the feature matrix.

In this example, the speech recognition is performed by the server. Thus, the computation burden on the client is reduced, and the hardware performance requirement of the client is also reduced accordingly.

Figure 15:
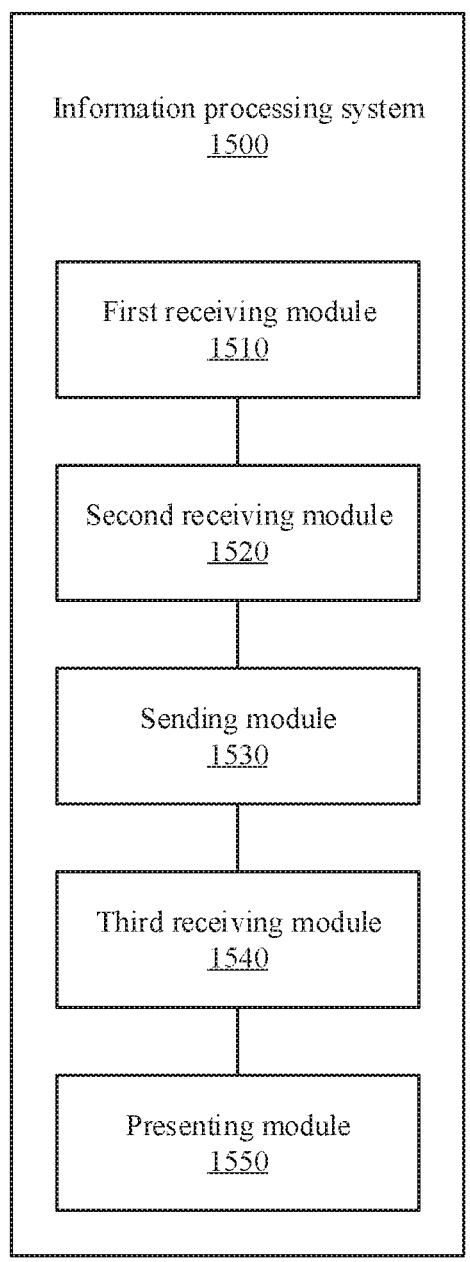
FIG. 15 is a schematic diagram of modules of an exemplary electronic device according to some embodiments of the present disclosure.

Reference is made to FIG. 15. Some embodiments of the present disclosure further provide an information processing system 1500. The information processing system 1500 can include the following modules 1510, 1520, 1530, 1540, and 1550.

A first receiving module 1510 is configured to receive first text information generated according to a speech and input through a first input device.

A second receiving module 1520 is configured to receive audio information recorded by a second input device. The audio information is generated and recorded according to the speech.

A sending module 1530 is configured to send the audio information or representation of the audio information to a server for performing, by the server, the speech recognition.

A third receiving module 1540 is configured to receive second text information obtained by the speech recognition and fed back by the server.

A presenting module 1550 is configured to present the first text information and the second text information. A correspondence relationship exists between content in the first text information and content in the second text information.

In this example, the functions and effects achieved by the electronic device can be explained with reference to other embodiments, and thus are not repeatedly described in detail here for the sake of brevity.

Figure 16:
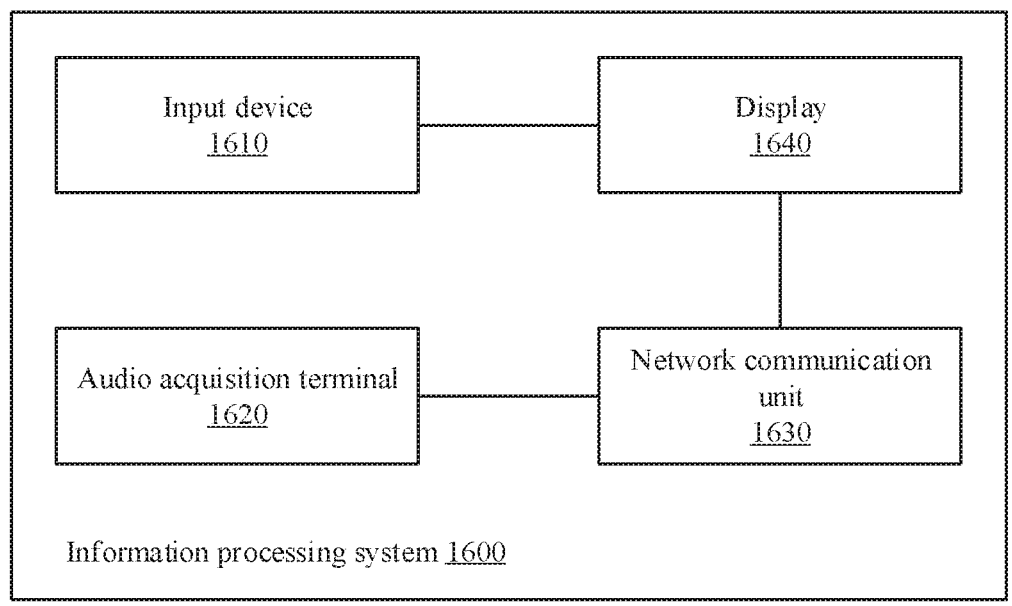
FIG. 16 is a schematic architectural diagram of an exemplary electronic device according to some embodiments of the present disclosure.

Reference is made to FIG. 16. Some embodiments of the present disclosure further provide an information processing system 1600. The information processing system can include: an input device 1610, an audio acquisition terminal 1620, a network communication unit 1630, and a display device 1640.

The input device 1610 is configured to receive first text information input by a user according to a speech.

The audio acquisition terminal 1620 is configured to record audio information according to the speech.

The network communication unit 1630 is configured to send the audio information or representation of the audio information to a server for performing, by the server, speech recognition. The network communication unit 1630 is also configured to receive second text information obtained by the speech recognition and fed back by the server.

The display device 1640 is configured to present the first text information and the second text information. A correspondence relationship exists between content in the first text information and content in the second text information.

In this example, the network communication unit 1630 can be set up in accordance with the standards specified in the communication protocol and used as an interface for network connection communication. The network communication unit 1630 can include, but is not limited to, any manner of wired and/or wireless communication.

The information processing system 1600 provided in this example can be explained with reference to other embodiments.

Some embodiments of the present disclosure further provide a computer storage medium storing a set of computer program instructions that are executable by one or more processors of a device to cause the device to perform a method, and the method includes: receiving first text information, which is generated according to a speech, input through a first input device; receiving audio information recorded by a second input device, in which the audio information is generated and recorded according to the speech; sending the audio information or representation of the audio information to a server for performing, by the server, speech recognition; receiving second text information obtained by the speech recognition and fed back by the server; and presenting the first text information and the second text information, in which a correspondence relationship exists between content in the first text information and content in the second text information.

In this example, the computer storage medium includes, but is not limited to, an RAM, an ROM, a cache, an HDD or a memory card.

The functions and effects achieved when the set of computer program instructions of the computer storage medium provided in this example is executed can be explained with reference to other embodiments.

Figure 17:
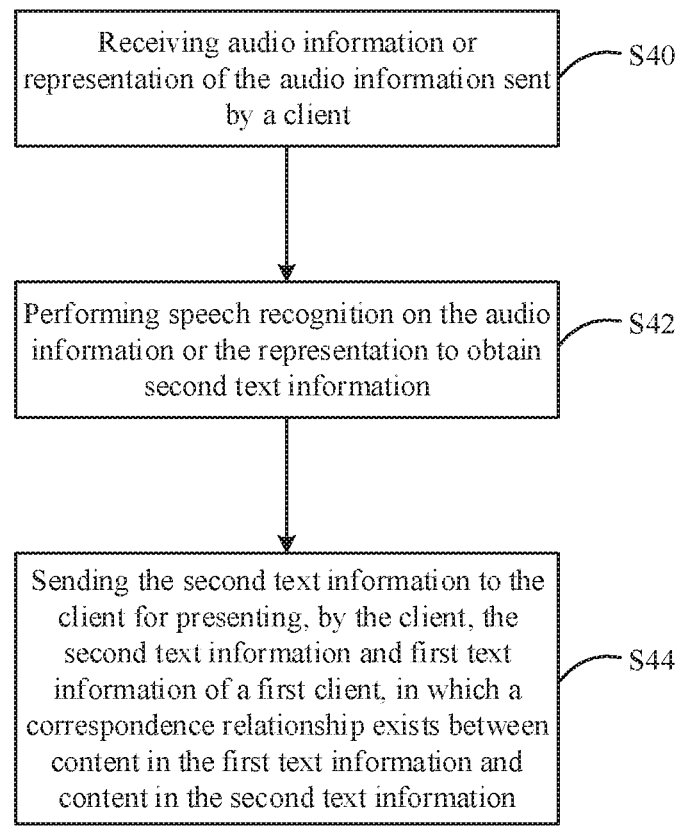
FIG. 17 is a schematic flowchart of an exemplary information processing method according to some embodiments of the present disclosure.

Reference is made to FIG. 17. Some embodiments of the present disclosure further provide an information processing method 1700. The information processing method 1700 can include following steps S40, S42, and S44.

In step S40, audio information or representation of the audio information sent by a client is received.

In step S42, speech recognition is performed on the audio information or the representation to obtain second text information.

In step S44, the second text information is sent to the client for presenting, by the client, the second text information and first text information of the client. A correspondence relationship exists between content in the first text information and content in the second text information.

In this example, the server receives the audio information or the representation sent by the client over a network. An algorithm model for performing speech recognition on the audio information or the representation can be deployed in the server. Specifically, the processing for the audio information or the representation can be obtained with reference to the description related to the audio information and the representation in the above embodiments, and thus further explanation is not repeatedly described in detail here for the sake of brevity.

In this example, the server can correspond to multiple clients, so the clients do not need to perform speech recognition. The server performs speech recognition uniformly. This reduces the hardware performance requirement of the client. Furthermore, the unified speech recognition is performed by the server, making it easy to maintain, update and upgrade the speech recognition algorithm.

The contents described in this example can be explained with reference to other embodiments, which are not repeatedly described in detail here for the sake of brevity.

Reference is made to FIG. 9 again. In some embodiments, the step of performing speech recognition by the server can include the following steps S20, and S22.

In step S20, the server identifies identity information corresponding to the audio information.

In step S22, the server identifies second text information expressed by a speech in the audio information, in which the second text information is associated with the identity information.

In this example, the server can identify the identity information corresponding to the audio information, so that the server can associate the second text information belonging to the same user with the identity information of the user. After the server adds the identity information into the second text information and provides it to the client, it is convenient for the user to read through the content presented by the client.

The functions and effects specifically achieved in this example can be explained with reference to other embodiments, and thus are not repeatedly described in detail here for the sake of brevity.

Figure 18:
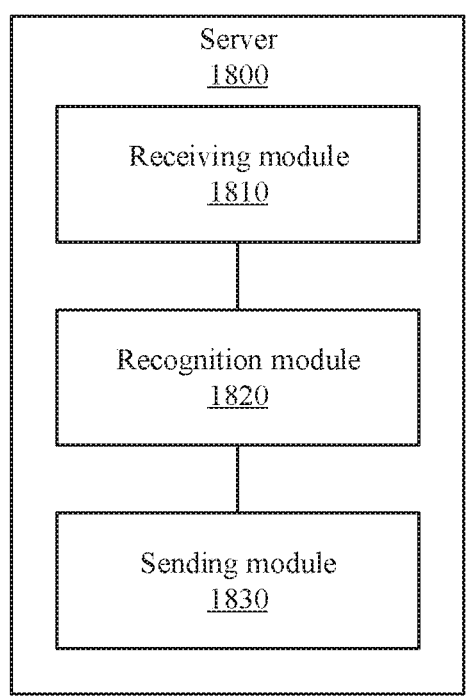
FIG. 18 is a schematic diagram of modules an exemplary electronic device according to some embodiments of the present disclosure.

Reference is made to FIG. 18. Some embodiments of the present disclosure further provide a server 1800. The server 1800 can include the following modules 1810, 1820, and 1830.

A receiving module 1810 is configured to receive audio information or representation of the audio information sent by a client.

A recognition module 1820 is configured to perform speech recognition on the audio information or the representation to obtain second text information.

A sending module 1830 is configured to send the second text information to the client for presenting, by the client, the second text information and first text information of the client. A correspondence relationship exists between content in the first text information and content in the second text information.

In this example, the functions and effects achieved by the server 1800 can be explained with reference to other embodiments, and thus are not repeatedly described in detail here for the sake of brevity.

Figure 19:
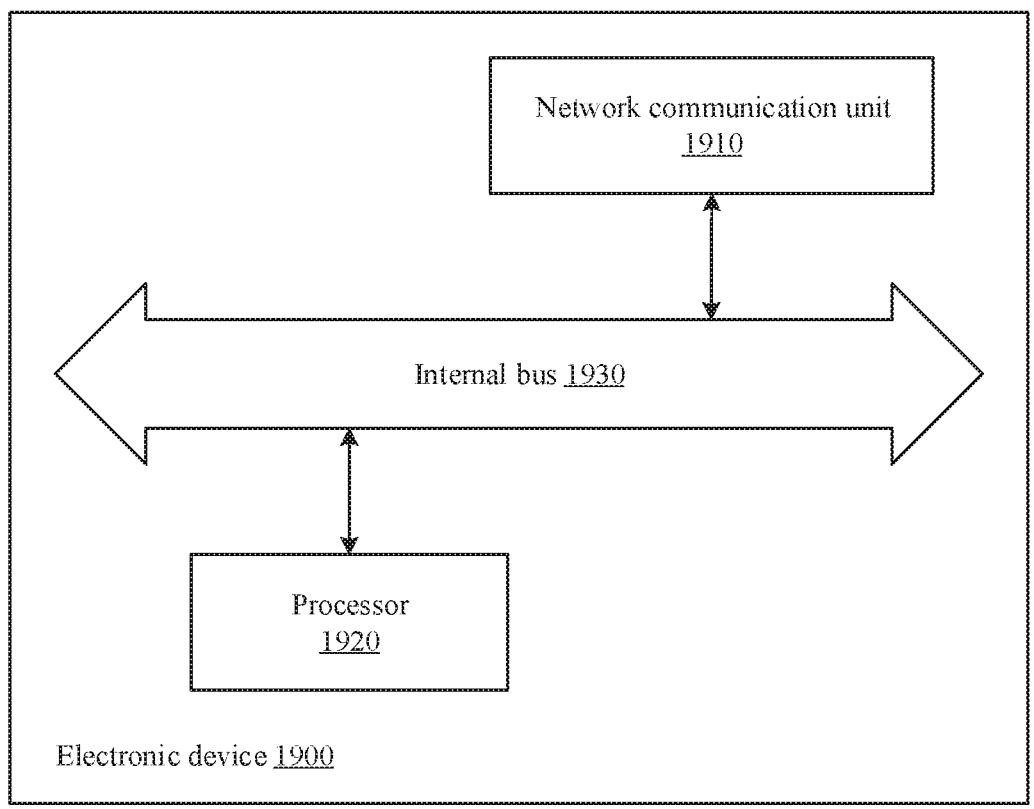
FIG. 19 is a schematic architectural diagram of an exemplary electronic device according to some embodiments of the present disclosure.

Reference is made to FIG. 19. Some embodiments of the present disclosure further provide an electronic device 1900. The electronic device 1900 can include: a network communication unit 1910 and a processor 1920 coupled to each other via an internal bus 1930.

The network communication unit 1910 is configured to receive audio information or representation of the audio information sent by a client and configured to send second text information provided by the processor 1920 to the client for presenting, by the client, the second text information and first text information of the client. A correspondence relationship exists between content in the first text information and content in the second text information.

The processor 1920 is configured to perform speech recognition on the audio information or the representation to obtain the second text information.

The functions and effects achieved by the electronic device 1900 provided in this example can be explained with reference to other embodiments.

Some embodiments of the present disclosure further provide a computer storage medium storing a set of computer program instructions that are executable by one or more processors of a device to cause the device to perform a method, and the method includes: receiving audio information or representation of the audio information sent by a client; performing speech recognition on the audio information or the representation to obtain second text information; and sending the second text information to the client for presenting, by the client, the second text information and first text information of the client, in which a correspondence relationship exists between content in the first text information and content in the second text information.

The functions and effects achieved when the set of computer program instructions of the computer storage medium provided in this example is executed can be explained with reference to other embodiments.

Figure 21:
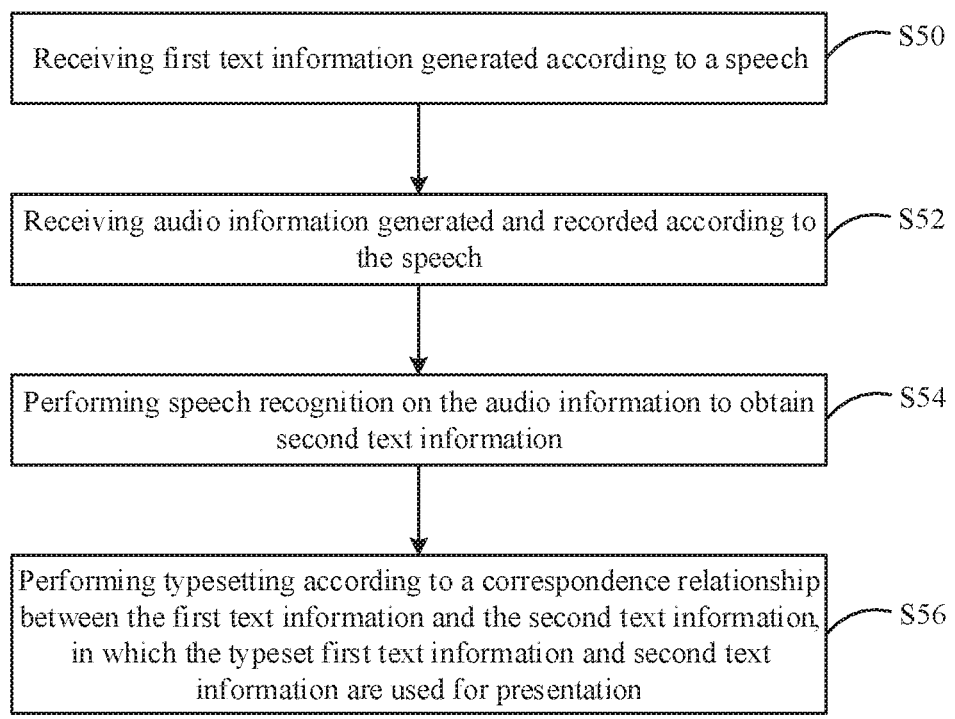
FIG. 21 is a schematic flowchart of an exemplary information processing method according to some embodiments of the present disclosure.

Reference is made to FIG. 21. Some embodiments of the present disclosure further provide an information processing method 2100. The information processing method 2100 can include following steps S50, S52, S54, and S56.

In step S50, first text information generated according to a speech is received.

In step S52, audio information is received, in which the audio information is generated and recorded according to the speech.

In step S54, speech recognition is performed on the audio information to obtain second text information.

In step S56, typesetting is performed according to a correspondence relationship between the first text information and the second text information. The typeset first text information and second text information are used for presentation.

In this example, the electronic device which performs the information processing method can perform speech recognition on the audio information to obtain the second text information, and can further typeset the first text information and the second text information according to the correspondence relationship between the first text information and the second text information.

In this example, the first text information and the second text information are typeset. The specific method of performing typesetting can be obtained with reference to the content of the above typesetting subsystem or explained with reference to other embodiments.

Some embodiments of the present disclosure further provide an electronic device including a processor. The processor is configured to receive first text information generated according to a speech; receive audio information recorded according to the speech; perform speech recognition on the audio information to obtain second text information; and perform typesetting according to a correspondence relationship between the first text information and the second text information, in which the typeset first text information and second text information are used for presentation.

The functions and effects achieved by the electronic device provided in this example can be explained with reference to other embodiments.

Some embodiments of the present disclosure further provide a computer storage medium storing a set of computer program instructions that are executable by one or more processors of a device to cause the device to perform a method, and the method includes: receiving first text information generated according to a speech; receiving audio information recorded according to the speech; performing speech recognition on the audio information to obtain second text information; and performing typesetting according to a correspondence relationship between the first text information and the second text information, in which the typeset first text information and second text information are used for presentation.

The functions and effects achieved when the computer program instruction of the computer storage medium provided in this example is executed can be explained with reference to other embodiments.

Figure 22:
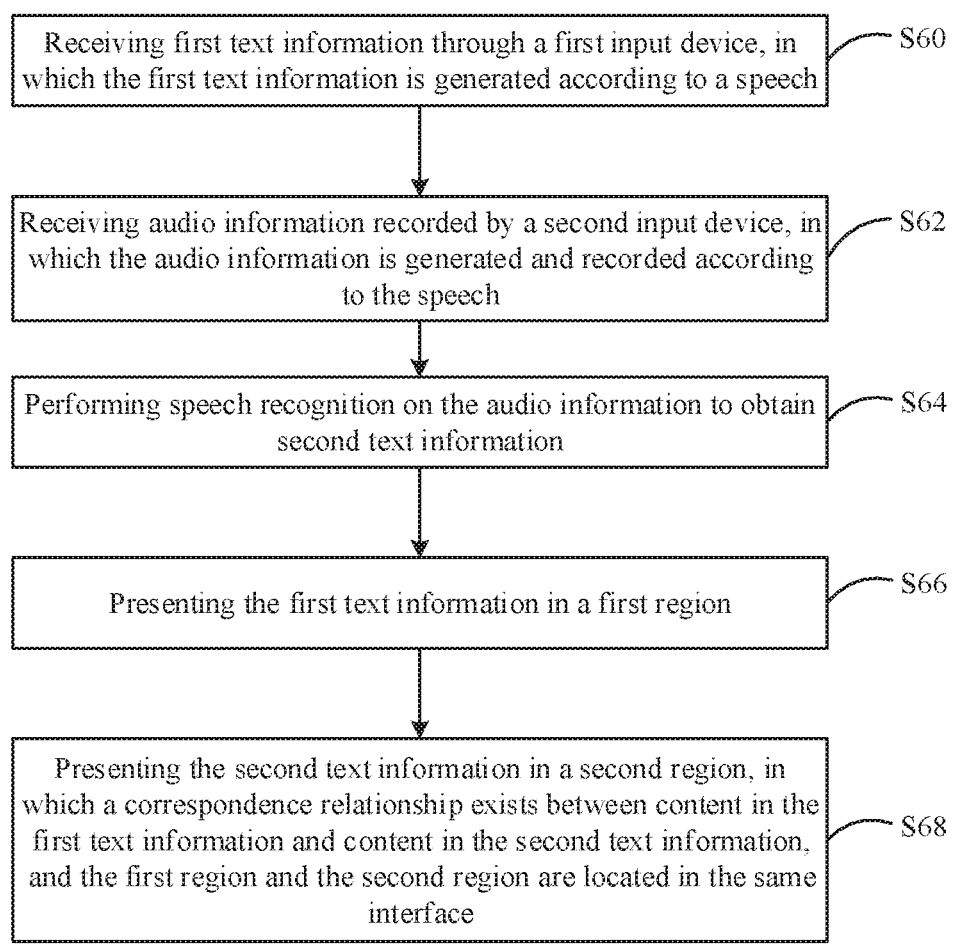
FIG. 22 is a schematic flowchart of an exemplary information processing method according to some embodiments of the present disclosure.

Reference is made to FIG. 22 and FIG. 3 together. Some embodiments of the present disclosure further provide an information processing method 2200. The information processing method 2200 can include following steps S60, S62, S64, S66 and S68.

In step S60, first text information, which is generated according to a speech and input through a first input device, is received.

In step S62, audio information recorded by a second input device and generated and recorded according to the speech is received.

In step S64, speech recognition is performed on the audio information to obtain second text information.

In step S66, the first text information is presented in a first region.

In step S68, the second text information is presented in a second region. A correspondence relationship exists between content in the first text information and content in the second text information, and the first region and the second region are located in the same interface.

In this example, an interface for presenting by a display device can be at least divided into a first region and a second region. The first region is used to present the first text information, and the second region is used to present the second text information. As such, by at least dividing the interface into a first region and a second region, the first text information and the second text information can be clearly distinguished from each other, thus bringing convenience to viewers.

In this example, the first text information and the second text information are generated in different methods. The first text information can be content input by the recorder according to his or her understanding of the speech, so that the first text information can be featured with being generalized, in a relatively concise language, and relatively emphasizing key points more. The second text information can be content obtained by speech recognition on the audio information. The second text information can be featured with being very comprehensive in content. However, compared with the first text information, the second text information may have some downsides such as having lengthy content and not emphasizing key points sufficiently. Through the correspondence relationship between the first text information and the second text information, the viewer can compare and refer to the first text information and the second text information, which brings the convenience to the reader.

Various embodiments in the present disclosure are described in a progressive manner. The same or similar parts between the embodiments can be obtained with reference to one another. In each example, the part that is different from other embodiments is described.

The embodiments may further be described using the following clauses:

1. An information processing method, comprising:
receiving first text information through a first input device, wherein the first text information is generated according to a speech;
receiving audio information recorded by a second input device, wherein the audio information is generated and recorded according to the speech;
performing speech recognition on the audio information to obtain second text information; and
presenting the first text information and the second text information, wherein a correspondence relationship exists between content in the first text information and content in the second text information.

2. The information processing method of clause 1, wherein performing speech recognition comprises:
recognizing identity information corresponding to the audio information; and
recognizing the second text information expressed in the speech of the audio information, wherein the second text information is associated with the identity information;
wherein the presenting accordingly comprises: presenting, in a corresponding manner, the identity information and the corresponding second text information.

3. The information processing method of clause 1, further comprising:
sending the audio information to a server for determining, by the server, identity information corresponding to the audio information; and
receiving the identity information corresponding to the audio information fed back from the server;
wherein the presenting accordingly comprises: presenting, in a corresponding manner, the identity information and the corresponding second text information.

4. The information processing method of clause 1, wherein presenting the first text information and the second text information comprises:
associating the first text information and the audio information received in adjacent time, to present, in a corresponding manner, the first text information and the second text information that is obtained by recognizing the audio information.

5. The information processing method of clause 1, wherein presenting the first text information and the second text information comprises:
performing semantic matching on the first text information with the second text information of the audio information that is generated within a designated time frame to obtain the second text information corresponding to the first text information.

6. The information processing method of clause 5, wherein performing semantic matching further comprises:
setting a reference time as the time when the first text information is received; and
setting the designated time frame according to the reference time, the reference time being within the designated time frame.

7. The information processing method of clause 1, further comprising:
modifying the first text information according to input from the first input device; and
outputting the modified first text information.

8. The information processing method of clause 1, further comprising:
when a triggering event occurs in the first text information or in the second text information, playing back the audio information corresponding to the first text information or the second text information in which the triggering event occurs.

9. The information processing method of clause 1, further comprising:
when a triggering event occurs in the first text information, displaying, with a designated style, the second text information corresponding to the first text information; or
when the triggering event occurs in the second text information, displaying, with a designated style, the first text information corresponding to the second text information.

10. An information processing system, comprising:
an input device configured to receive first text information input by a user, wherein the first text information is generated according to a speech;
an audio acquisition terminal configured to record audio information according to the speech;
a processor configured to perform speech recognition on the audio information to obtain second text information; and
a display device configured to present the first text information and the second text information, wherein a correspondence relationship exists between content in the first text information and content in the second text information.

11. A non-transitory computer-readable medium that stores a set of computer program instructions that are executable by one or more processors of a device to cause the device to perform a method comprising:
receiving first text information through a first input device, wherein the first text information is generated according to a speech;
receiving audio information recorded by a second input device, wherein the audio information is generated and recorded according to the speech;
performing speech recognition on the audio information to obtain second text information; and
presenting the first text information and the second text information, wherein a correspondence relationship exists between content in the first text information and content in the second text information.

12. An information processing method, comprising:
receiving first text information through a first input device, wherein the first text information is generated according to a speech;
receiving audio information recorded by a second input device, wherein the audio information is generated and recorded according to the speech;
sending the audio information or representation of the audio information to a server for performing, by the server, speech recognition;
receiving second text information obtained by the speech recognition and fed back from the server; and presenting the first text information and the second text information, wherein a correspondence relationship exists between content in the first text information and content in the second text information.

13. The information processing method of clause 12, wherein presenting the first text information and the second text information comprises:

associating the first text information and the audio information received in adjacent time, to present, in a corresponding manner, the first text information and the second text information that is obtained by recognizing the audio information.

14. The information processing method of clause 12, wherein presenting the first text information and the second text information comprises:

performing semantic matching on the first text information with the second text information of the audio information that is generated within a designated time frame to obtain the second text information corresponding to the first text information.

15. The information processing method of clause 14, wherein performing semantic matching further comprises:

setting a reference time as the time when the first text information is received; and setting the designated time frame according to the reference time, the reference time being within the designated time frame.

16. The information processing method of clause 12, further comprising:

modifying the first text information according to input from the first input device; and outputting the modified first text information.

17. The information processing method of clause 12, further comprising:

when a triggering event occurs in the first text information or in the second text information, playing back the audio information corresponding to the first text information or the second text information in which the triggering event occurs.

18. The information processing method of clause 12, further comprising:

when a triggering event occurs in the first text information, displaying, with a designated style, the second text information corresponding to the first text information; or when the triggering event occurs in the second text information, displaying, with the designated style, the first text information corresponding to the second text information.

19. An information processing system, comprising:

an input device configured to receive first text information input by a user, wherein the first text information is generated according to a speech;

an audio acquisition terminal configured to record audio information according to the speech;

a network communication unit configured to send the audio information or representation of the audio information to a server for performing, by the server, speech recognition and configured to receive second text information obtained by the speech recognition and fed back from the server; and a display device configured to present the first text information and the second text information, wherein a correspondence relationship exists between content in the first text information and content in the second text information.

20. A non-transitory computer-readable medium that stores a set of computer program instructions that are executable by one or more processors of a device to cause the device to perform a method comprising:

receiving first text information through a first input device, wherein the first text information is generated according to a speech;

receiving audio information recorded by a second input device, wherein the audio information is generated and recorded according to the speech;

sending the audio information or representation of the audio information to a server for performing, by the server, speech recognition;

receiving second text information obtained by the speech recognition and fed back by the server; and presenting the first text information and the second text information, wherein a correspondence relationship exists between content in the first text information and content in the second text information.

21. An information processing method, comprising:

receiving audio information or representation of the audio information sent by a client;

performing speech recognition on the audio information or the representation to obtain second text information; and sending the second text information to the client for presenting, by the client, the second text information and first text information of the client, wherein a correspondence relationship exists between content in the first text information and content in the second text information.

22. The information processing method of clause 21, wherein performing the speech recognition comprises:

recognizing identity information corresponding to the audio information; and recognizing the second text information expressed by the speech in the audio information, wherein the second text information is associated with the identity information.

23. An electronic device comprising:

a network communication unit configured to: receive audio information or representation of the audio information sent by a client; and send second text information to the client for presenting, by the client, the second text information and first text information of the client, wherein a correspondence relationship exists between content in the first text information and content in the second text information; and a processor configured to cause the electronic device to perform speech recognition on the audio information or the representation to obtain and provide the second text information.

24. A non-transitory computer-readable medium that stores a set of computer program instructions that are executable by one or more processors of a device to cause the device to perform a method comprising:

receiving audio information or representation of the audio information sent by a client;

performing speech recognition on the audio information or the representation to obtain second text information; and sending the second text information to the client for presenting, by the client, the second text information and first text information of the client, wherein a correspondence relationship exists between content in the first text information and content in the second text information.

25. An information processing method, comprising:

receiving first text information generated according to a speech;

receiving audio information recorded according to the speech;

performing speech recognition on the audio information to obtain second text information; and performing typesetting according to a correspondence relationship between the first text information and the second text information, wherein the typeset first text information and second text information are used for presentation.

26. The information processing method of clause 25, wherein performing typesetting comprises:

associating the first text information and the audio information received in adjacent time, to present, in a corresponding manner, the first text information and the second text information that is obtained by recognizing the audio information.

27. The information processing method of clause 25, wherein performing typesetting comprises:

performing semantic matching on the first text information with the second text information of the audio information that is generated within a designated time frame to obtain the second text information corresponding to the first text information.

28. The information processing method of clause 27, wherein performing semantic matching further comprises:

setting a reference time as the time when the first text information is received; and setting the designated time frame according to the reference time, the reference time being within the designated time frame.

29. The information processing method of clause 25, further comprising:

receiving input for modifying the first text information to modify the first text information.

30. An electronic device, comprising:

a processor configured to cause the electronic device to:
receive first text information generated according to a speech;
receive audio information recorded according to the speech;
perform speech recognition on the audio information to obtain second text information; and
perform typesetting according to a correspondence relationship between the first text information and the second text information, wherein the typeset first text information and second text information are used for presentation.

31. A non-transitory computer-readable medium that stores a set of computer program instructions that are executable by one or more processors of a device to cause the device to perform a method comprising:

receiving first text information generated according to a speech;
receiving audio information recorded according to the speech;
performing speech recognition on the audio information to obtain second text information; and
performing typesetting according to a correspondence relationship between the first text information and the second text information, wherein the typeset first text information and second text information are used for presentation.

32. An information processing method, comprising:

receiving first text information through a first input device, wherein the first text information is generated according to a speech;
receiving audio information recorded by a second input device, wherein the audio information is generated and recorded according to the speech;
recognizing the audio information to obtain second text information;
presenting the first text information in a first region; and
presenting the second text information in a second region, wherein a correspondence relationship exists between content in the first text information and content in the second text information, and the first region and the second region are located in the same interface.

It is appreciated that improvements of many method procedures at present can be considered as direct improvements on hardware circuit structures. Many designers program the improved method procedures into hardware circuits to obtain corresponding hardware circuit structures. Therefore, it is improper to assume that the improvement of a method procedure cannot be implemented by using a physical hardware module. For example, a Programmable Logic Device (PLD) (e.g., a Field Programmable Gate Array (FPGA)) is such an integrated circuit, and its logic functions are determined by a user programming device. Designers program by themselves to "integrate" a digital system into a PLD, without asking a chip manufacturer to design and manufacture a dedicated integrated circuit chip. Moreover, at present, the programming is often implemented by using "logic compiler" software, instead of manually manufacturing an integrated circuit chip. The logic compiler software is similar to a software complier used for developing and coding a program, and source codes before the compile also need to be coded by using a specific programming language, which is referred to as a Hardware Description Language (HDL). There are various types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog2 are most commonly used now. Those skilled in the art should also understand that a hardware circuit for implementing the logic method procedure can be easily obtained by slightly performing logic programming to the method procedure using any of the hardware description languages mentioned above and programming it into an integrated circuit.

Those skilled in the art also understand that in addition to implementing the controller by using pure computer readable program codes, it is also possible to perform logical programing to the method steps to enable the controller to implement the same function in a form of a logic gate, a switch, an ASIC, a programmable logic controller or an embedded microcontroller. Therefore, such a controller can be considered as a hardware component, and apparatuses included in the controller and configured to implement various functions can also be considered as structures inside the hardware component. Alternatively, the apparatuses configured to implement various functions can even be considered as both software modules configured to implement the method and hardware structures inside the hardware component.

From the descriptions of the above embodiments, it can be understood that those skilled in the art can clearly understand that the present disclosure can be achieved by software with a necessary universal hardware platform. Based on such understanding, the technical solution of the present disclosure, or the portion contributing to the prior art can also be embodied in the form of a software product. The software product can be stored in a storage medium, such as an ROM/RAM, a magnetic disk, or an optical disc, and include several instructions that enable a computer device (which may be a personal computer, a server, a network device, or the like) to execute the method described in the embodiments or certain portions of the embodiments of the present disclosure.

Although the present disclosure is described through above embodiments, those of ordinary skill in the art should understand that the present disclosure may have various variations and modifications without departing from the spirit of the present disclosure, and the appended claims cover those variations and modifications without departing from the spirit of the present disclosure.

What is claimed is:

1. An information processing method, comprising:
   receiving first text information through a first input device, wherein the first text information is generated according to a speech heard by a user and inputted by the user using the first input device;
   receiving audio information recorded by a second input device, wherein the audio information is generated and recorded according to the speech;
   performing speech recognition on the audio information to obtain second text information;
   presenting the first text information and the second text information in a single window, wherein the presenting comprises recording a receiving time of the first text information and a receiving time of the second text information, and determining whether to display the first text information and the second text information in a corresponding manner based on a difference between the receiving time of the first text information and the receiving time of the second text information; and
   modifying the first text information based on the second text information.

2. The information processing method of claim 1, wherein performing speech recognition comprises:
   recognizing identity information corresponding to the audio information; and
   recognizing the second text information expressed in the speech of the audio information, wherein the second text information is associated with the identity information;
   wherein the presenting accordingly comprises: presenting, in a corresponding manner, the identity information and the corresponding second text information.

3. The information processing method of claim 1, further comprising:
   sending the audio information to a server for determining, by the server, identity information corresponding to the audio information; and
   receiving the identity information corresponding to the audio information fed back from the server;
   wherein the presenting accordingly comprises: presenting, in a corresponding manner, the identity information and the corresponding second text information.

4. The information processing method of claim 1, wherein presenting the first text information and the second text information comprises:
   associating the first text information and the audio information received in adjacent time, to present, in a corresponding manner, the first text information and the second text information that is obtained by recognizing the audio information.

5. The information processing method of claim 1, wherein presenting the first text information and the second text information comprises:
   performing semantic matching on the first text information with the second text information of the audio information that is generated within a designated time frame to obtain the second text information corresponding to the first text information.

6. The information processing method of claim 5, wherein performing semantic matching further comprises:
   setting a reference time as the time when the first text information is received; and
   setting the designated time frame according to the reference time, the reference time being within the designated time frame.

7. The information processing method of claim 1, further comprising:
   modifying the first text information according to input from the first input device; and
   outputting the modified first text information.

8. The information processing method of claim 1, further comprising:
   when a triggering event occurs in the first text information or in the second text information, playing back the audio information corresponding to the first text information or the second text information in which the triggering event occurs.

9. The information processing method of claim 1, further comprising:
   when a triggering event occurs in the first text information, displaying, with a designated style, the second text information corresponding to the first text information; or
   when the triggering event occurs in the second text information, displaying, with a designated style, the first text information corresponding to the second text information.

10. An information processing system, comprising:
    an input device configured to receive first text information input by a user, wherein the first text information is generated according to a speech heard by the user;
    an audio acquisition terminal configured to record audio information according to the speech;
    a processor configured to perform speech recognition on the audio information to obtain second text information; and
    a display device configured to present the first text information and the second text information in a single window, wherein the presenting comprises recording a receiving time of the first text information and a receiving time of the second text information, and determining whether to display the first text information and the second text information in a corresponding manner based on a difference between the receiving time of the first text information and the receiving time of the second text information,
    wherein the first text information is modified based on the second text information.

11. The information processing system of claim 10, further comprising:
    a network communication unit configured to send the audio information or representation of the audio information to a server for performing, by the server, speech recognition and configured to receive second text information obtained by the speech recognition and fed back from the server.

12. The information processing system of claim 10, wherein the processor is configured to perform typesetting according to the correspondence relationship between the first text information and the second text information, wherein the typeset first text information and second text information are used for presentation.

13. A non-transitory computer-readable medium that stores a set of computer program instructions that are executable by one or more processors of a device to cause the device to perform a method comprising:

receiving first text information through a first input device, wherein the first text information is generated according to a speech heard by a user and inputted by the user using the first input device;

receiving audio information recorded by a second input device, wherein the audio information is generated and recorded according to the speech;

performing speech recognition on the audio information to obtain second text information; and presenting the first text information and the second text information in a single window, wherein the presenting comprises recording a receiving time of the first text information and a receiving time of the second text information, and determining whether to display the first text information and the second text information in a corresponding manner based on a difference between the receiving time of the first text information and the receiving time of the second text information, wherein the first text information is modified based on the second text information.

14. The non-transitory computer-readable medium of claim 13, wherein the set of computer program instructions that are executable by one or more processors of the device further causes the device to perform:

recognizing identity information corresponding to the audio information; and recognizing the second text information expressed in the speech of the audio information, wherein the second text information is associated with the identity information;

wherein the presenting accordingly comprises: presenting, in a corresponding manner, the identity information and the corresponding second text information.

15. The non-transitory computer-readable medium of claim 13, wherein the set of computer program instructions that are executable by one or more processors of the device further causes the device to perform:

typesetting according to the correspondence relationship between the first text information and the second text information, wherein the typeset first text information and second text information are used for presentation.

16. The non-transitory computer-readable medium of claim 15, wherein performing typesetting comprises:

associating the first text information and the audio information received in adjacent time, to present, in a corresponding manner, the first text information and the second text information that is obtained by recognizing the audio information.

17. The non-transitory computer-readable medium of claim 15, wherein performing typesetting comprises:

performing semantic matching on the first text information with the second text information of the audio information that is generated within a designated time frame to obtain the second text information corresponding to the first text information.

18. The non-transitory computer-readable medium of claim 17, wherein performing semantic matching further comprises:

setting a reference time as the time when the first text information is received; and setting the designated time frame according to the reference time, the reference time being within the designated time frame.

19. The non-transitory computer-readable medium of claim 13, wherein the set of computer program instructions that are executable by one or more processors of the device further causes the device to perform:

when a triggering event occurs in one of the first text information or the second text information:

playing back the audio information corresponding to the first text information or the second text information in which the triggering event occurs, or;

displaying, with a designated style, the other one of the first text information or the second text information corresponding to the first text information or the second text information in which the triggering event occurs.

20. The non-transitory computer-readable medium of claim 13, wherein the set of computer program instructions that are executable by one or more processors of the device further causes the device to perform:

presenting the first text information in a first region; and presenting the second text information in a second region, wherein the first region and the second region are located in the same interface.

* * * * *